US009948828B2

United States Patent
Endo et al.

(10) Patent No.: US 9,948,828 B2
(45) Date of Patent: Apr. 17, 2018

(54) IMAGE SENSING APPARATUS AND METHOD OF CONTROLLING OPERATION OF SAME

(71) Applicant: FUJIFILM Corporation, Tokyo (JP)

(72) Inventors: Hisashi Endo, Saitama (JP); Yitong Zhang, Saitama (JP); Masahiko Sugimoto, Saitama (JP); Junya Kitagawa, Saitama (JP); Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 37 days.

(21) Appl. No.: 14/717,008

(22) Filed: May 20, 2015

(65) Prior Publication Data

US 2015/0256718 A1 Sep. 10, 2015

Related U.S. Application Data

(63) Continuation of application No. PCT/JP2013/081779, filed on Nov. 26, 2013.

(30) Foreign Application Priority Data

Jan. 25, 2013 (JP) .................................. 2013-012204

(51) Int. Cl.
*H04N 1/60* (2006.01)
*H04N 9/68* (2006.01)
(Continued)

(52) U.S. Cl.
CPC ............. *H04N 1/6027* (2013.01); *H04N 1/62* (2013.01); *H04N 5/23216* (2013.01);
(Continued)

(58) Field of Classification Search
CPC .... H04N 1/6027; H04N 9/68; H04N 5/23216; H04N 5/23293; H04N 9/045; G06T 5/001
See application file for complete search history.

(56) References Cited

U.S. PATENT DOCUMENTS

| 9,077,945 B2 * | 7/2015 | Ueda ..................... H04N 9/735 |
| 2006/0120598 A1 * | 6/2006 | Takahashi ............... G06T 5/009 |
| | | 382/167 |
| 2009/0009525 A1 | 1/2009 | Hirashima et al. |

FOREIGN PATENT DOCUMENTS

| JP | 7-320024 A | 12/1995 |
| JP | 2002-118859 A | 4/2002 |

(Continued)

OTHER PUBLICATIONS

International Search Report issued in PCT/JP2013/081779, dated Mar. 4, 2014.

*Primary Examiner* — Twyler Haskins
*Assistant Examiner* — Fayez Bhuiyan
(74) *Attorney, Agent, or Firm* — Birch, Stewart, Kolasch & Birch, LLP

(57) ABSTRACT

A subject is imaged repeatedly and color images of the subject are obtained. A color histogram is generated from the color subject image obtained and a representative color is decided from the color histogram generated. A specific color range that can be considered a color identical with the representative color is decided from the color histogram and representative color. Color outside the specific color range in the color subject image is changed to gray, an image of the subject in which the non-specific colors have been changed to gray is obtained and the image is displayed. Processing such as deciding the specific color range is repeated. When an instruction to fix the specific color is issued, the specific color range is fixed.

10 Claims, 17 Drawing Sheets

(51) Int. Cl.
  *H04N 5/232* (2006.01)
  *H04N 9/04* (2006.01)
  *H04N 9/12* (2006.01)
  *H04N 1/62* (2006.01)
  *H04N 9/64* (2006.01)

(52) U.S. Cl.
  CPC ......... *H04N 5/23293* (2013.01); *H04N 9/045* (2013.01); *H04N 9/12* (2013.01); *H04N 9/643* (2013.01); *H04N 9/68* (2013.01)

(56) References Cited

FOREIGN PATENT DOCUMENTS

| | | |
|---|---|---|
| JP | 2010-102596 A | 5/2010 |
| JP | 2010-200270 A | 9/2010 |
| JP | 2011-82965 A | 4/2011 |
| WO | WO 2006/059573 A1 | 6/2006 |

\* cited by examiner

IMAGE SENSING APPARATUS AND METHOD OF CONTROLLING OPERATION OF SAME

CROSS-REFERENCE TO RELATED APPLICATIONS

This application is a Continuation of PCT International Application No. PCT JP2013/081779 filed on Nov. 26, 2013, which claims priority under 35 U.S.C. § 119(a) to Japanese Patent Application No. 2013-01224 filed Jan. 25, 2013. Each of the above application (s) is hereby expressly incorporated by reference, in its entirety, into the present application.

BACKGROUND OF THE INVENTION

Field of the Invention

This invention relates to an image sensing apparatus and to a method, of controlling this apparatus.

Description of the Related Art

In the special effects function of digital cameras and in the production of TV commercials, the general practice is to execute image processing in which, by leaving only a specific color intact and changing the other colors to gray, an effect is obtained, in which attention is drawn to the portion having the specific color. In image processing of this kind, it is possible to change to gray the colors outside of a pre-registered range of colors if the color distribution of the portion desired to be noticed is already known. However, in a case where a photographic subject has not been decided as in a digital camera, it is necessary to devise a method of setting the specific color.

It is comparatively easy to change to gray colors other than a specific color by having the user designate one candidate from among several specific color candidates (such as red, yellow and blue) the chromaticity range of which is predetermined, or by having the user designate a portion of the image of a subject.

Further, there is a technique in which a specific color area is decided with regard to a subject in which a relationship with respect to average luminance can be modeled as in the manner of the color of skin or the color of the sky (Patent Document 1), a technique for extracting the color information at a designated position in an image and converting the region corresponding to this color information to another color (Patent Document 2), and a technique for acquiring the color distribution of a subject by preparatory shooting using a provisional background and then changing the background at the time of actual shooting of the subject (Patent Document 3).

Patent Document 1: WO 2006/059573
Patent Document 2: Japanese Patent Application Laid-Open No. 7-320024
Patent Document 3: Japanese Patent Application Laid-Open No 2002-118859

When graying colors, other than a designated color, it is necessary to re-designate the specific color and to re-shoot if the result of graying is not satisfactory. This complicates operation. Further, obtaining satisfactory results takes a great deal of time. Furthermore, processing for graying the image of a moving subject is extremely difficult.

Further, according to the description set forth in Patent Document 1, since the target is a subject in which the relationship with respect to average luminance is capable of being modeled in advance, this technique cannot be applied to a unspecified subject. According to the description set forth in Patent Document 2, an operation for designating a position at which color information is extracted from within an image and verification of the results of the conversion are required to be repeated. Furthermore, according to the description set forth in Patent Document 3, the technique cannot be used for general subjects in which the background cannot be set.

SUMMARY OF THE INVENTION

An object of the present invention is to allow a user to display, without requiring the user to perform a complicated operation, the image of a subject in which a change has been made in the saturation of color within a specific color range that can be considered identical with a specific color, or in the saturation of a color outside the specific color range.

An image sensing apparatus according to the present invention comprises: a color imaging device (color imaging means) for sensing the image of a subject and outputting color image data representing a color image of the subject; a specific color decision device (specific color decision means) for analyzing the color image of the subject and deciding a specific color from the color image of the subject; a specific color range decision device (specific color range decision means) for deciding a specific color range indicating the range of a color that can be considered a color substantially identical with the specific color decided by the specific color decision device; a saturation adjustment device (saturation adjustment means) for changing color saturation of the color image of the subject, the saturation adjustment device changing saturation of color within the specific color range decided by the specific color range decision device or of color outside the specific color range decided by the specific color range decision device; a display control device (display control means) for controlling a display unit so as to display the color image of the subject the saturation of which has been changed by the saturation adjustment device; an imaging control device (imaging control means) for exercising control so as to repeat processing for outputting a color image of the subject, processing for deciding a specific color, processing for deciding a specific color range, processing for adjusting saturation and processing for controlling display of the color image of the subject, these processes being executed by the color imaging device, the specific color decision device, the specific color range decision device, the saturation adjustment device and the display control device; and a saturation adjustment control device (saturation adjustment control means), operative upon receipt of a specific color fixing instruction, for controlling the saturation adjustment device so as to adjust saturation of the color image of the subject based upon a specific color range fixed by the specific color fixing instruction (the rangers fixed to the specific color range decided by the specific color range decision device at the time at which the specific color fixing instruction is received).

The present invention also provides an operation control method suited to the above-described image sensing apparatus. Specifically, the present invention provides a method of: sensing the image of a subject and outputting color image data representing a color image of the subject; analyzing the color image of the subject and deciding a specific color from the color image of the subject; deciding a specific color range indicating the range of a color that can be considered a color substantially identical with the specific color decided; changing color saturation of the color image of the subject, wherein saturation of color within the decided specific color range decided or of color outside the decided specific color range is changed; controlling a display unit, so as to display the color image of the subject the saturation of which has been changed; exercising control so as to repeat processing for outputting a color image of the subject, processing for deciding a specific color, processing for deciding a specific color range, processing for adjusting saturation and processing for controlling display of the color image of the subject; and upon receipt of a specific color fixing instruction, adjusting saturation of the color image of the subject based upon a specific color range fixed by the specific color fixing instruction.

In accordance with the present invention, the image of a subject is sensed and a color image of the subject is obtained. A specific color is decided from the color image of the subject and a specific color range that can be considered a color substantially identical with the decided specific color is decided. In the color image of the subject, the saturation of color within the specific color range decided or of color outside the specific color range is changed. Such imaging processing, processing for deciding a specific color, processing for deciding a specific color range, processing for adjusting saturation and display processing, which results in display of a color image the saturation of which has been changed, is repeated. When a specific color fixing instruction is received, the saturation of the color image of the subject is adjusted based upon a specific color range fixed by the specific color fixing instruction. Thus the user, without performing a complicated operation, can display the image of a subject in which a change has been made in the saturation of color within a specific color range that can be considered identical with a specific color or of color outside the specific color range. Further, after the specific color fixing instruction has been received, the saturation of color within the specific color range fixed by the specific color fixing instruction or of color outside the specific color range can be changed and the image of the subject the saturation of which has thus been changed can be displayed.

By way of example, the specific color decision device decides that a specific color of an image of interest within a specific color retention area, which is a portion of the color image of the subject, is the specific color of the color image of the subject, and, by way of example, the saturation adjustment device changes, in the color image of the subject, the saturation of a color outside the specific color retention area, i.e., lowers the saturation of a color outside the specific color range decided by the specific color range decision device.

The apparatus may further comprise a color area partitioning device for partitioning the color image of a subject into areas color by color. In this case, by way of example, the saturation adjustment device changes, in the color image of the subject, the saturation of a color outside the specific color retention area, i.e., lowers the saturation of a color outside the specific color range, which has been decided by the specific color range decision device, with the exception of an area containing a portion that includes the specific color decided by the specific color decision device within the specific color retention area.

By way of example, the specific color range decision device decides, based upon multiple color images of a subject obtained by performing image capture multiple times in succession, that a weighted specific color range, which is obtained by taking a weighted average of multiple specific color ranges decided for every color image of the subject, is the specific color range.

By way of example, the saturation adjustment device changes the color saturation of the color image of a subject captured after the color image of a subject used in the specific color range decided by the specific color range decision device, i.e., changes the saturation of a color within the specific color range decided by the specific color range decision device or of a color outside the specific color range decided by the specific color range decision device.

By way of example, the specific color decision device decides that the specific color of an image of interest within a region of interest, which is a portion of the color image of the subject, is the specific color of the color image of the subject.

The apparatus may further comprise a region-of-interest display control device (region-of-interest display control means) for controlling the display unit in such a manner that the extent of the region of interest is displayed on the color image of the subject displayed based upon control exercised by the display control device.

By way of example, the saturation adjustment device may gradually change the saturation of the color image of the subject near boundaries of the specific color range decided by the specific color range decision device.

By way of example, the saturation adjustment control device may control the saturation adjustment device in such a manner that the color saturation of the color image of the subject is changed gradually near boundaries of the specific color range fixed by the specific color fixing instruction.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
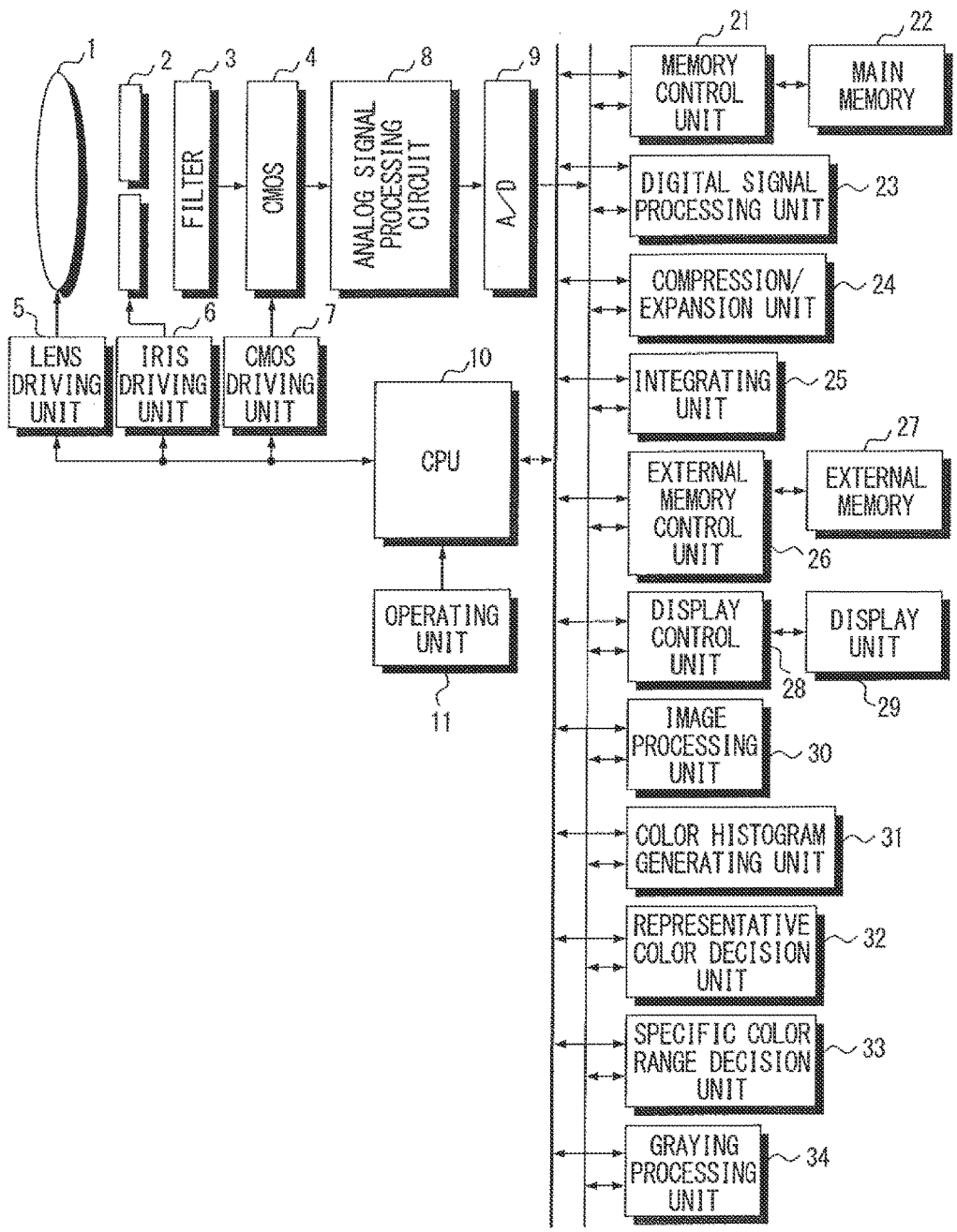
FIG. 1 is a block diagram illustrating the electrical configuration of a digital still camera.

FIG. 1 is a block diagram illustrating the electrical configuration of a digital still camera (image sensing apparatus) according to an embodiment of the present invention.

The overall operation of the digital still camera is controlled by a CPU 10.

The digital still camera according to this embodiment changes to gray the colors that are outside a specific color range that can be considered identical with a specific color within the color image of a subject obtained by sensing the image of the subject.

The digital still camera includes an operating unit 11. The operating unit 11 includes a power button, a mode selecting dial, a two-stage stroke-type shutter-release button and the like. Operating signals output from these members included in the operating unit 11 are input to the CPU 10.

The two-stage stroke-type shutter-release button serves as operating means for inputting instructions related to imaging and is constituted by a two-stage stroke-type shutter-release switch having so-called half-press and full-press release positions. An S1-ON signal is output in the digital still camera by pressing the release switch halfway, and an S2-ON signal, is output by pressing the release switch fully from the half-press position. When the S1-ON signal is output, preparatory processing to prepare for actual image capture, an example of such preparatory processing being autofocus adjustment and automatic exposure control, is executed. When the S2-ON signal is output, actual image-capture processing is executed. The shutter-release button is not limited to the two-stage stroke-type configuration having half-press and full-press release positions and may just as well output the S1-ON signal and S2-ON signal by a single-stroke operation.

Further, in a configuration in which operating instructions are issued by operation of a touch-sensitive panel, the operating means may be realized by arranging it so that an operating instruction is output by touching an area, which corresponds to the operating instruction, displayed on the screen of the touch-sensitive panel. In this embodiment, so long as instructions can be issued to execute preparatory processing for preparing for actual image capture and to execute processing for actual image capture, there is no limitation upon the type of shutter-release button. Further, it may be arranged so that preparatory processing for actual image capture and actual image capture per se are executed successively by operating instructions to a single operating means.

An imaging lens 1, iris 2 and optical low-pass filter 3 are disposed in front of a CMOS (Complementary Metal-Oxide Semiconductor) sensor 4. The imaging lens 1, iris 2 and CMOS sensor 4 are controlled by a lens driving unit 5, iris driving unit 6 and CMOS driving unit 7, respectively.

When an imaging mode is set by a mode setting dial, the subject is imaged at a fixed period by the CMOS sensor 4 and an analog video signal representing the color image of the subject is output from the CMOS sensor 4 at the fixed period. The analog video signal that is output from the CMOS sensor 4 input to an analog signal processing circuit 8, which subjects the signal to predetermined analog signal processing such as a gamma correction. The analog video signal that is output from the analog signal processing circuit 8 is converted to digital image data in an analog/digital conversion circuit 9.

The digital image data is applied to a main memory 22 by control exercised by a memory control unit 21 and is stored in the main memory 22 temporarily.

Digital image data is read out of the main memory 22 and is input to a digital signal processing unit 23. The digital signal processing unit 23 executes predetermined digital signal processing such as a white balance adjustment.

Digital image data that is output from the digital signal processing unit 23 is stored in the main memory 22 temporarily by control exercised by the memory control unit 21. The digital image data is read out of the main memory 22 and is input to a color histogram generating unit 31. The color histogram generating unit 31 generates a color histogram of the digital image data. Data representing the generated color histogram is input to a representative color decision unit 32. On the basis of the color histogram generated, the representative color (specific color) decision unit 32 decides a representative color (specific color) of the color image of the subject obtained by imaging. Data representing the representative color decided and data representing the color histogram generated is input to a specific color range decision unit 33. From the data representing the representative color and the data representing the color histogram, the specific color range decision unit 33 decides a specific color range indicating a hue (color) range that can be considered a color identical with the representative color that has been decided. Data indicating the specific color range decided is input to a graying processing unit 34. Further, the digital image data that has been stored in the main memory 22 also is applied to the graying processing unit 34. In the color image of the subject, color outside the specific color range (or within the specific color range) is changed to gray (the saturation thereof is changed) by the graying processing unit 34.

The digital image data that has been subjected to graying processing in the graying processing unit 34 is subjected to predetermined image processing in an image processing unit 30 in order to be displayed. Digital image data that has been read out of the image processing unit 30 is applied to a display unit 29 by a display control unit 28. Displayed on the display screen of the display unit 29 is a color image of the subject in which color within the specific color range appears as that color and color outside the specific color range is changed to gray.

Up until the shutter-release button is pressed halfway, processing for deciding specific color range is repeated for every color image of the subject obtained by imaging as described above, and color images of the subject are repeatedly displayed in which color within the specific color range appears as that color and color outside the specific color range is changed to gray. When the shutter-release button is pressed halfway, the specific color range that has been decided in the specific color range decision unit 33 as described above is fixed. With regard to the color image of a subject obtained after the shutter-release button has been pressed halfway, color within the fixed specific color range appears as that color and color outside the specific color range is changed to gray.

Further, when the shutter-release button is pressed halfway, the digital image data that has been read out of the main memory 22 is input to an integrating unit 25 so that the luminance component is integrated. The f-stop number is decided based upon the integrated luminance component and the iris 2 is controlled by the iris driving unit 6 in such a manner that the f-stop number decided is obtained. The digital signal processing unit 23 calculates the in-focus distance and the imaging lens 1 is positioned by the lens driving unit 5 in such a manner that the calculated in-focus distance is obtained.

When the shutter-release button is pressed fully, image data representing the image of the subject in which color within the fixed specific color range is retained and color outside the specific color range has been changed to gray is input to a compression/expansion unit 24. The image data that has been compressed in the compression/expansion unit 24 is applied to and recorded in a removable external memory 27 by control exercised by an external memory control unit 26. It may of course be arranged so that in the case where the shutter-release button is pressed fully, the image of the subject in which color within the fixed specific color range is retained and color outside the specific color range has been changed to gray is displayed, and image data that does not undergo graying processing is recorded in the external memory 27.

The digital still camera can also be set to a playback mode but this is not described in this embodiment.

FIGS. 2 and 3 and FIGS. 4 and 5 are flowcharts illustrating processing executed by the digital still camera. In order to facilitate comprehension of the flowcharts shown in FIGS. 2 and 3, FIGS. 4 and 5 also illustrate color images of a subject obtained by imaging. Like step numbers in FIGS. 2 to 5 indicate identical processing steps.

When the power supply of the digital still camera is turned on and the imaging mode is set, a subject is imaged (step 41) and a color image of the subject is obtained in the manner set forth above.

Figure 6:
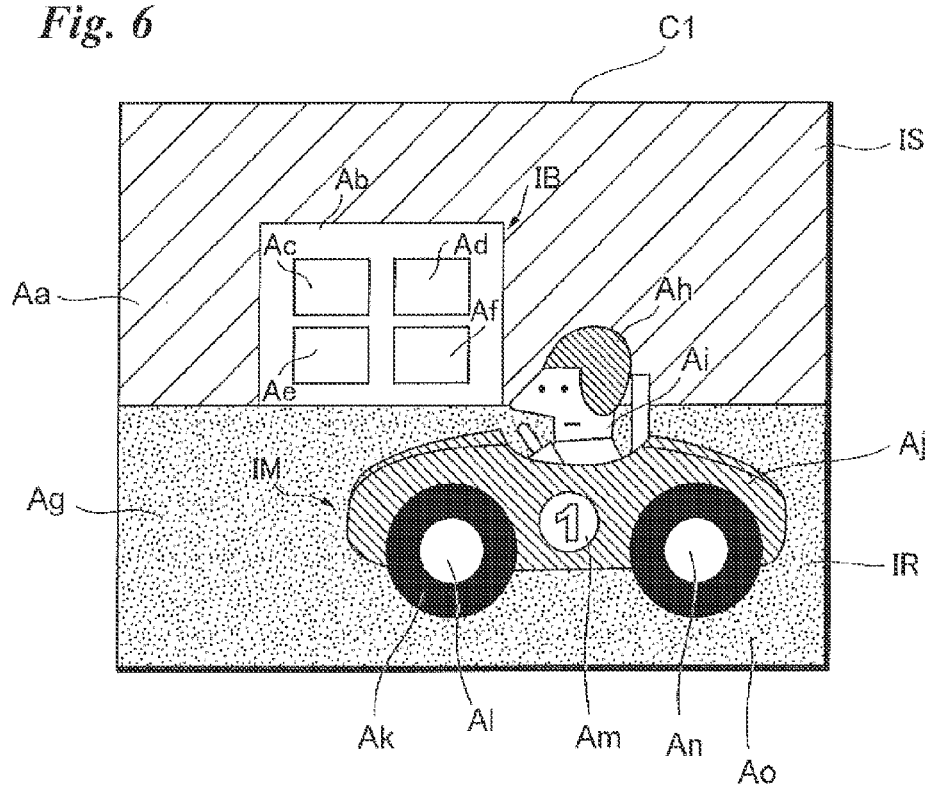
FIG. 6 is an example of the color image of a subject.

FIG. 6 is an example of a color image C1 of a subject.

The color subject image C1 contains an automobile IM traveling on a road IR. A building IB and sky IS exist as background.

The sky IS constitutes a light-blue area Aa, and the building IB includes a white area Ab as the building proper and color areas Ac, Ad, Ae and Af that are windows. The road IR is a brown area Ag, and the automobile IN has a green area Aj as the vehicle body, black areas Ak and Ao as tires, silver areas Al and An as wheels and a white area Am as a number. Further, the image includes a skin-color area Ai as the face of the driver of the automobile IM, and a green area Ah as the helmet of the driver. The colors of these areas Aa to Ao are represented by hatching, dots and black fill, etc.

With reference again to FIGS. 2 and 4, when the color image of the subject is obtained, a color histogram of the color image obtained is generated (step 42). When the color histogram is generated, the representative color of the color image of the subject is decided from the generated color histogram (step 43). Next, the specific color range is decided from the color histogram and representative color (step 44).

Figure 8:
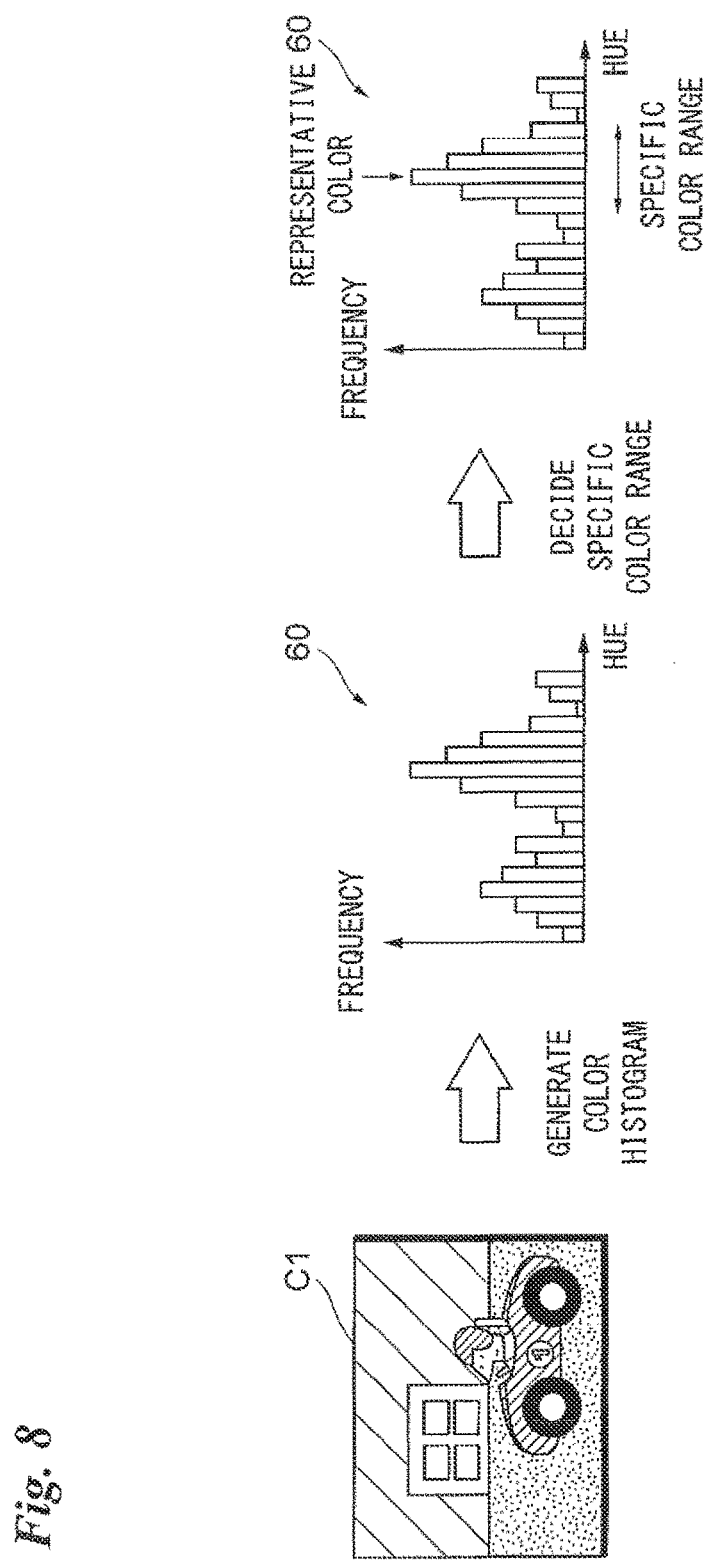
FIG. 8 illustrates the manner in which a specific color range is decided.

FIG. 8 illustrates how the specific color range, is decided from the color subject image C1.

When the color subject image C1 is obtained, a color histogram 60 is obtained with regard to the color subject image C1 in the manner described above. The horizontal axis of the color histogram 60 represents hue and the vertical axis indicates the frequency of occurrence of the hue in the color subject image C1. The color distribution of the color subject image C1 can be ascertained from the color histogram 60. In this embodiment, the representative color is taken as the color having the highest frequency of occurrence. Further, it is assumed here that the color green has the highest frequency of occurrence. In this embodiment, the range of a color that can be considered a color identical with the representative color is decided upon as the specific color range, and colors that are outside this specific color range are changed to gray, as set forth above. For example, the range over which a predetermined hue fluctuates about on the hue of the color green having the highest frequency of occurrence is adopted as the specific color range.

With reference again to FIGS. 2 and 4, when the specific color range is decided, graying processing is executed by reducing the saturation of colors outside this specific color range (step 45). The image of the subject in which non-specific colors have been grayed obtained by graying processing is displayed on the display screen of the display unit 29 (step 46).

Figure 7:
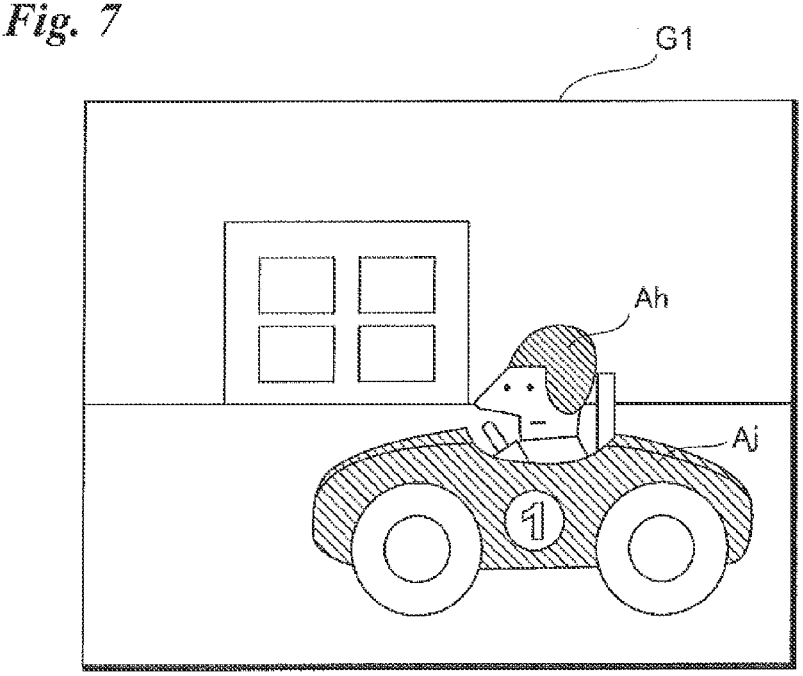
FIG. 7 is an example of the image of a subject in which non-specific colors have been changed to gray.

FIG. 7 is an example of an image C1 of a subject in which non-specific colors have been changed to gray.

As described above, the green color of the area Aj of the vehicle body of the automobile, as well as the green color of the area Ah of the helmet, which color can be considered a color identical with the color green having the highest frequency of occurrence, is expressed in color, and the areas other than these areas Aj and Ah are rendered gray by lowering the saturation thereof. It should be noted that, in terms of the drawings, the areas Aj and Ah assumed to be green are indicated by hatching and the other areas are expressed in white.

Figure 4:
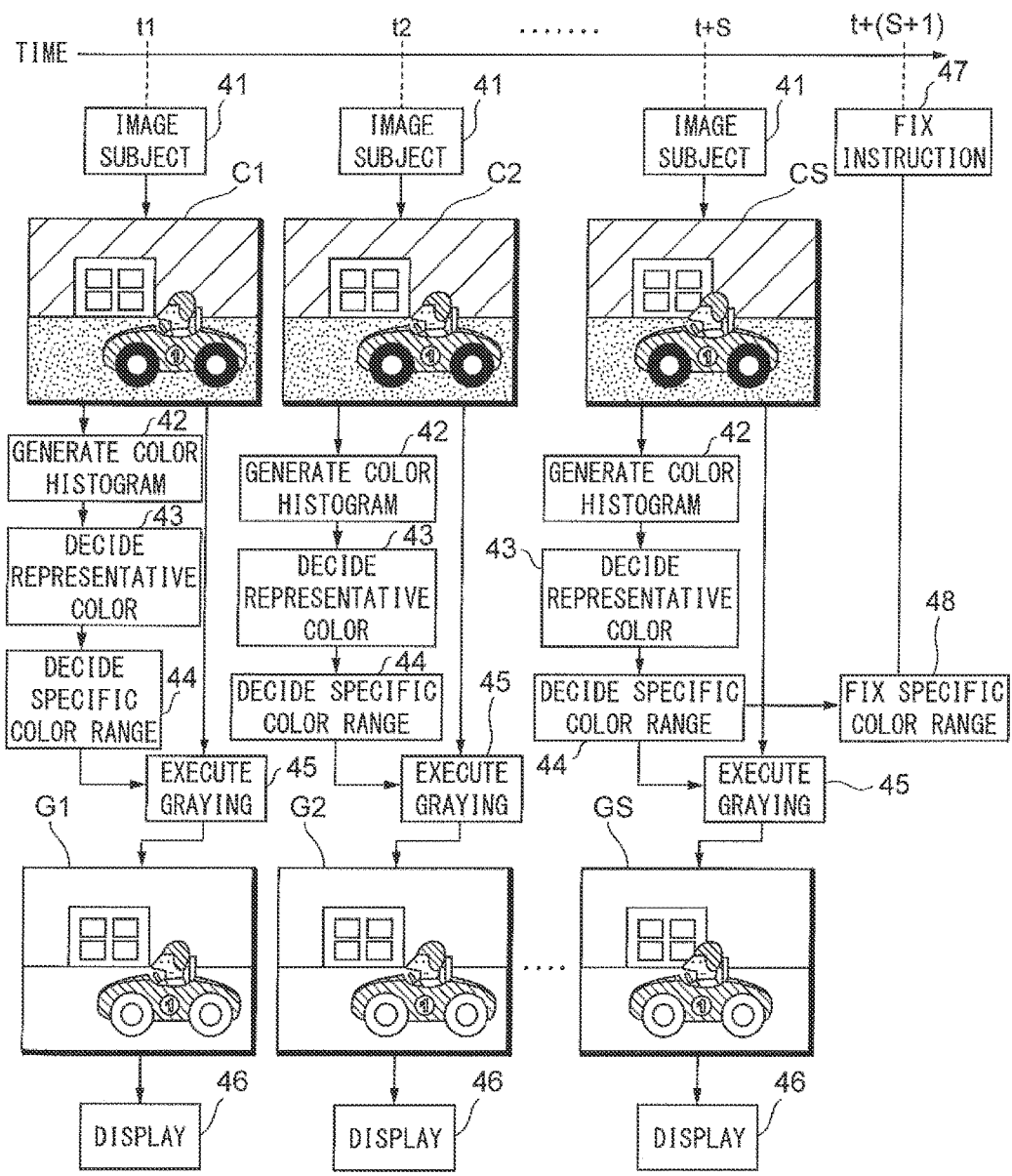

With reference again to FIG. 2, the processing of steps 41 to 46 is repeated until an instruction to fix the specific color range is issued. At time t1, as shown in FIG. 4, the subject is imaged, the color subject image C1 is obtained and the image C1 of the subject in which non-specific colors have been changed to gray is obtained. Similarly, at time t2, the subject is imaged, a color subject image C2 is obtained and an image G2 of the subject in which non-specific colors have been changed to gray is obtained. Thus, until there is an instruction to fix the specific color range, processing for deciding the specific color range is repeated, images of the subject in which non-specific colors have been changed to gray, namely in which colors outside the decided specific color range have been grayed, are obtained and the obtained images of the subject in which non-specific colors have been changed to gray are displayed on the display screen of the display unit 29.

Figure 2:
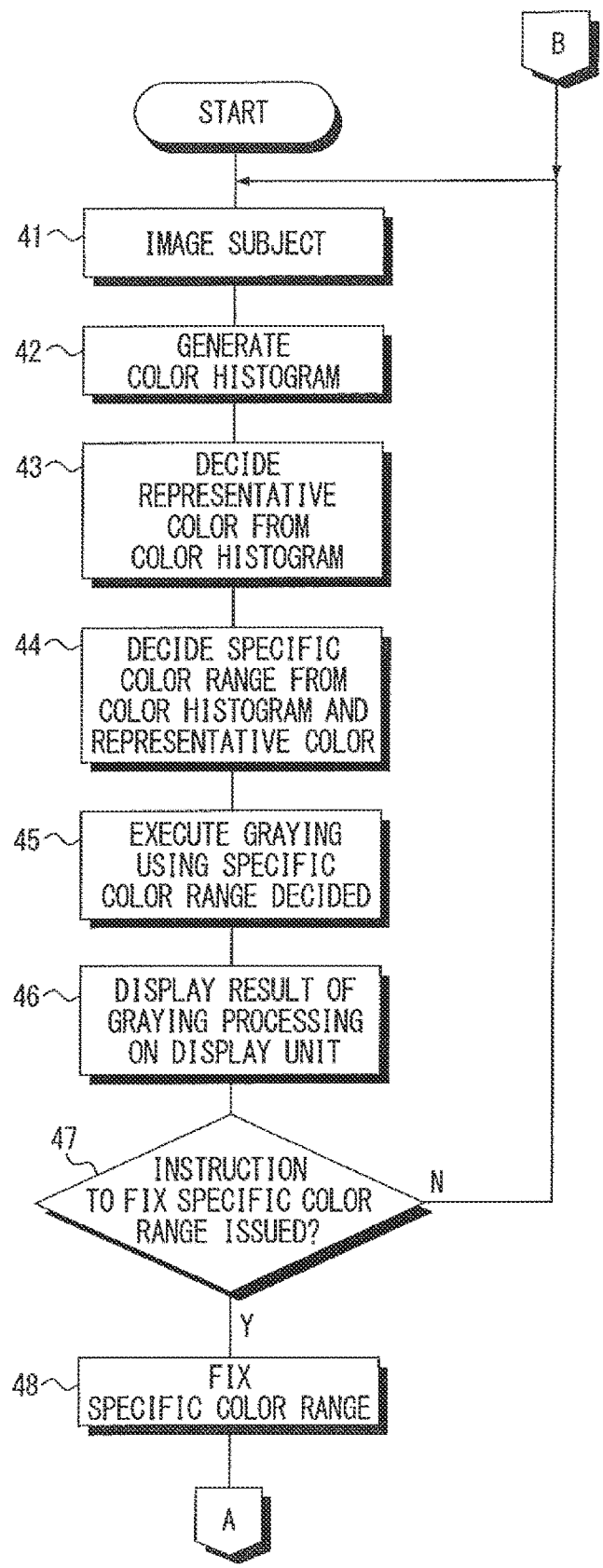
FIGS. 2 to 5 are flowcharts illustrating processing executed by the digital still camera.

With reference to FIGS. 2 and 4, if the shutter-release button is pressed halfway at time t+(S+1), for example, then it is judged that an instruction to fix the specific color range has been issued ("YES" at step 47). In response, the specific color range that was decided immediately prior to halfway depression of the shutter-release button is fixed (step 48).

Figure 3:
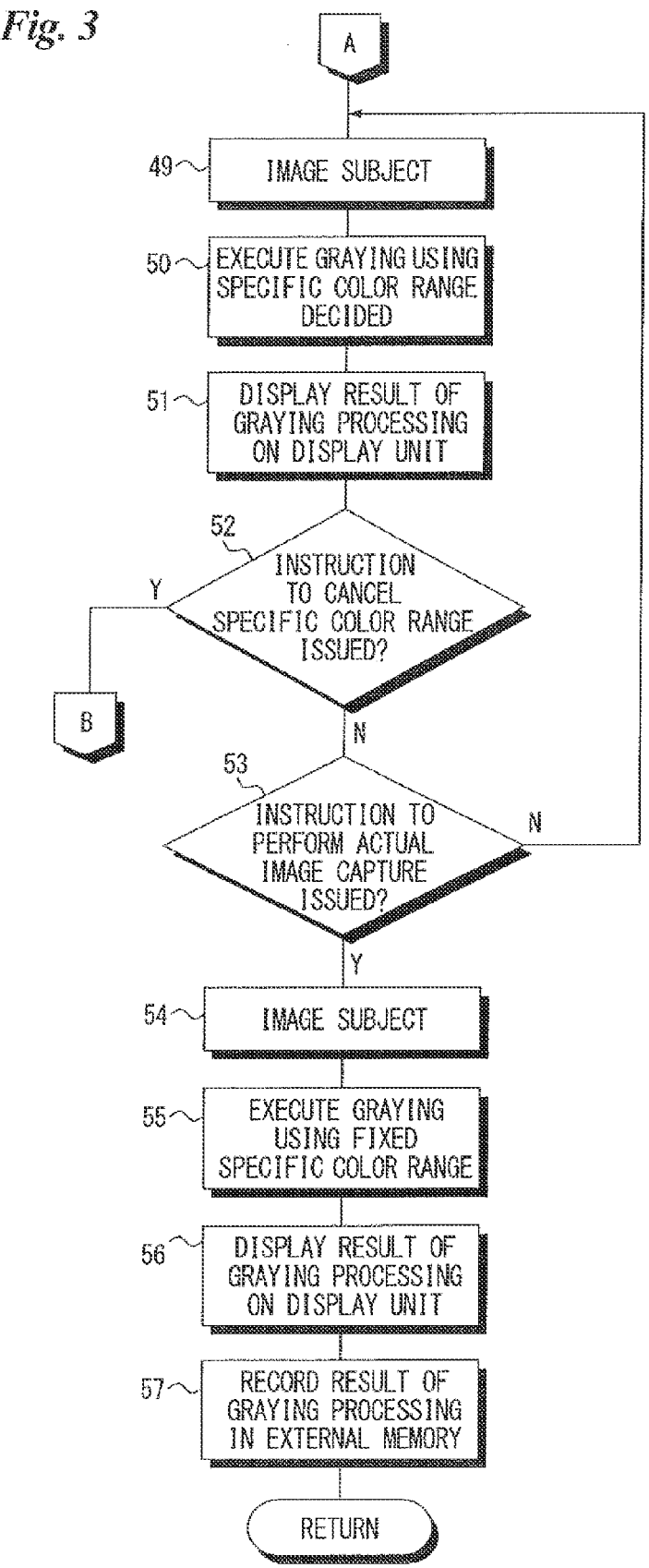
Figure 5:
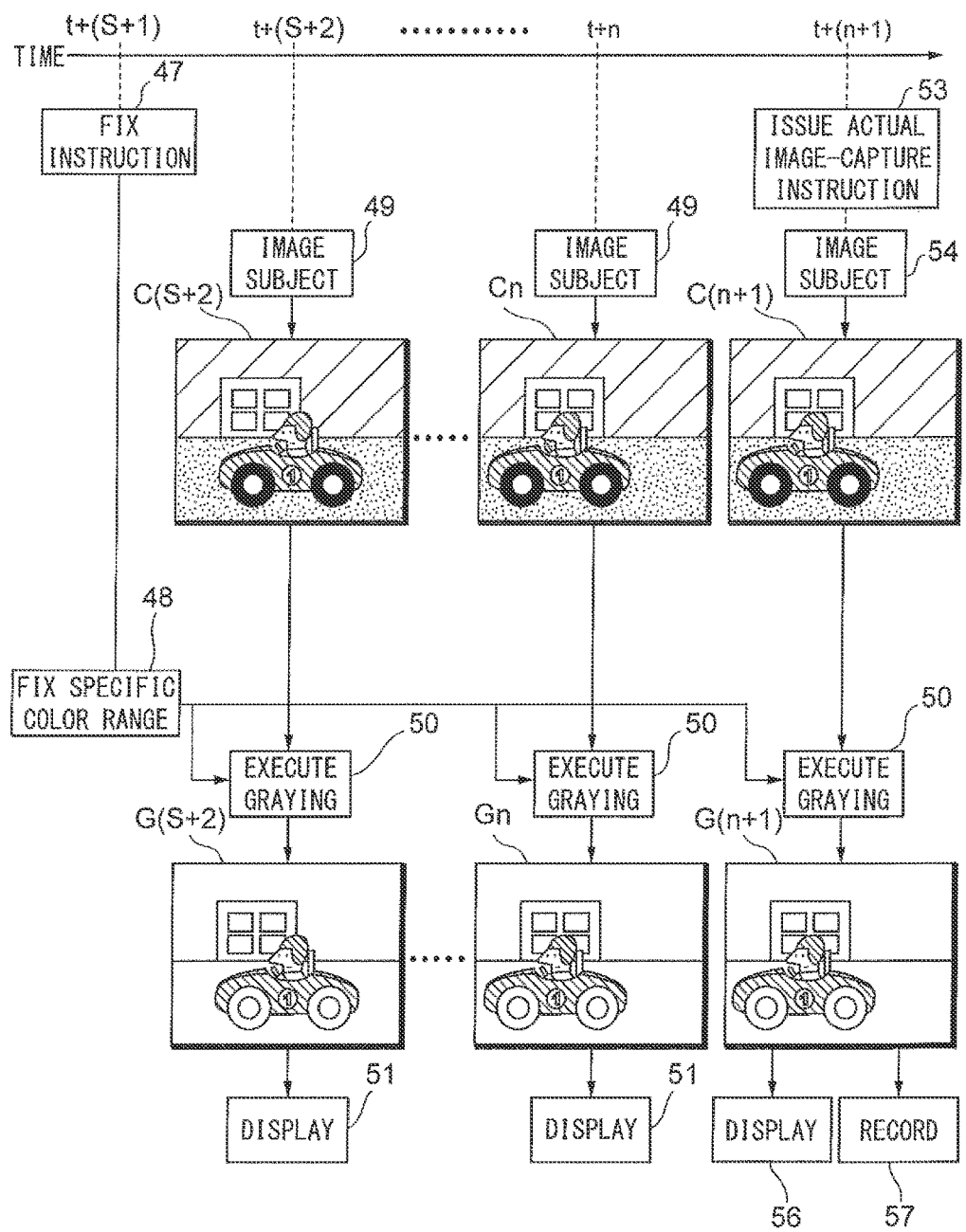

With reference to FIGS. 3 and 5, the subject is imaged again (step 49) and a color image of the subject is obtained. The color image of the subject obtained is subjected to graying processing that changes to gray the colors that are outside the fixed specific color range (step 50). The image of the subject In which the non-specific colors have been changed to gray obtained by the graying processing is displayed on the display screen of the display unit 29. If there is no instruction to cancel the specific color range ("NO" at step 52) and, moreover, there is no instruction to perform actual image capture ("NO" at step 53), the processing of steps 49 to 51 is repeated. At times t(S+2) and t+n, as shown in FIG. 5, color images C(S+2), Cn and so on of the subject are obtained by imaging the subject and, by using the specific color range that has been fixed, images G(S+2), Gn and so on of the subject in which non-specific colors have been changed to gray, namely images that result from applying graying processing to the color images C(S+2), on and so on, are obtained. The obtained images G(S+2), Gn and so on of the subject in which non-specific colors have been changed to gray are displayed on the display screen of die display unit 29.

With reference again to FIG. 3, control returns to the processing from step 41 onward shown in FIGS. 2 and 4 if an instruction to cancel the specific color range is applied to the digital still camera ("YES" at step 52). The subject is imaged again and processing for deciding the specific color range is repeated until there is an instruction to fix the specific color range.

If an instruction to perform actual image capture is applied to the digital still camera by pressing the shutter-release button fully at time t+(n+1) (step 53), the subject is imaged (step 54) and a color image C(n+1) of the subject representing the image of the subject is obtained. With regard to the obtained color image C(n+1) of the subject, colors outside the fixed specific color range are changed to gray (step 55). An image G(n+1) of the subject in which non-specific colors have been changed to gray is displayed on the display screen of the display unit 29 (step 56). Further, image data representing the image G(n+1) of the subject in which no colors have been changed to gray is recorded in the external memory 27 (step 57). Naturally, as mentioned above, it may be arranged so that the image G(n+1) of the subject in which non-specific colors have been changed to gray is displayed on the display screen of the display unit 29 and image data representing the color image C(n+1) of the subject that has not been subjected to graying processing is recorded in the external memory 27, or it may be arranged so that the image data representing the image G(n+1) of the subject in which non-specific colors have been changed to gray and the image data representing the color image C(n+1) of the subject that has not been subjected to graying processing are both recorded in the display unit 29.

By executing the above-described processing, a user can set a specific color range and image a subject while checking, in real time, the result of graying processing without repeatedly performing complicated operations for setting the specific color range and for checking results. The time it takes to record the image of a subject can be shortened and the principal subject that is to be the focus of attention can be recorded reliably even if the principal subject moves.

In the foregoing embodiment, use is made of a one-dimensional color histogram in which the horizontal axis represents hue and the vertical axis represents frequency of occurrence of the hue. However, it is permissible to utilize a two-dimensional color histogram in which the color differences Cr and Cb are plotted along the axes so that the histogram will represent the frequency of occurrence of these color differences, or three-dimensional histograms in which the colors R, G, B are plotted along the axes so that the histogram will represent frequency of occurrence of these colors. Further, it may be arranged so that, rather than adopting a given fixed range as the specific color range centered on the hue having the highest frequency of occurrence, the specific color range is decided from the hue having the highest frequency of occurrence based upon a dispersion value of the color histogram, or the specific color range is decided in accordance with the state of the color histogram in such a manner that a hue for which the frequency of occurrence is greater than a given value is adopted as the specific color range.

Furthermore, instead of adopting as the representative color the hue having the highest frequency of occurrence obtained from a color histogram, the saturation of the color image of a subject may be detected and the color that gives the highest saturation may be adopted as the representative color. Furthermore, the representative color need not necessarily be a single color but can be multiple colors. Further, in the foregoing embodiment, halfway depression of the shutter-release button is adopted as the instruction to fix the specific color range. However, a fixing instruction button (a fixing instruction area if the fixing instruction is applied from a touch-sensitive panel) operated separate from the halfway depression operation of the shutter-release button may be provided and it may be arranged so that the instruction to fix the specific color range is applied to the digital still camera from this fixing instruction button. It goes without saying that a button for instructing that the specific color range should be cancelled is cancelling instruction area if the cancel instruction is applied from a touch-sensitive panel) may be included in the operating unit 11 of the digital still camera.

Further, in the foregoing embodiment, colors in the color image of a subject that are outside the specific color range are grayed and a color in the color image of the subject that is within the specific color range is excluded from such graying processing. However, it may be arranged so that a color in the color image of a subject that is within the specific color range is grayed and colors in the color image of the subject that are outside the specific color range are excluded from the graying processing.

Figure 9:
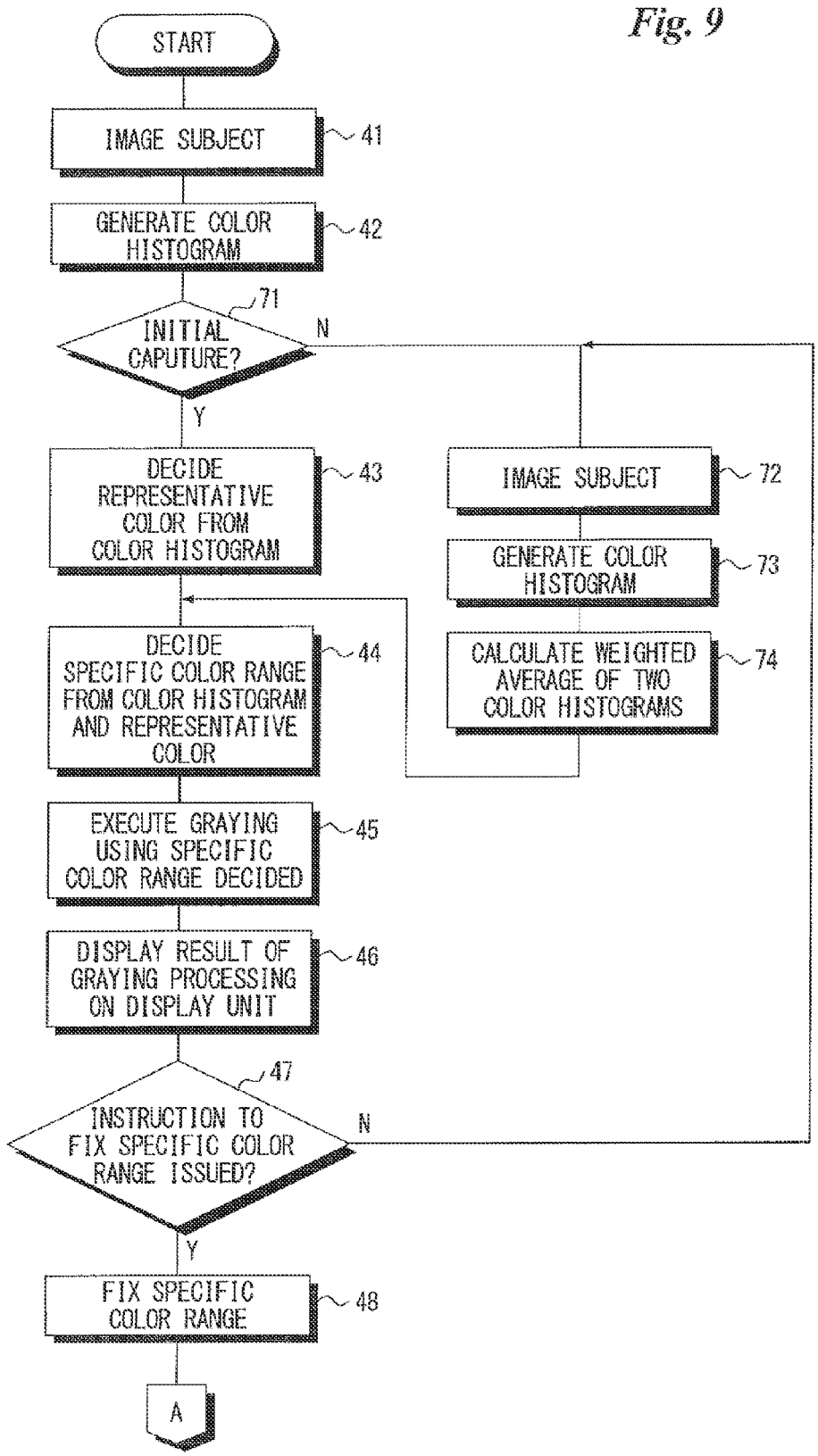
FIG. 9 is a flowchart illustrating processing executed by the digital still camera.
Figure 10:
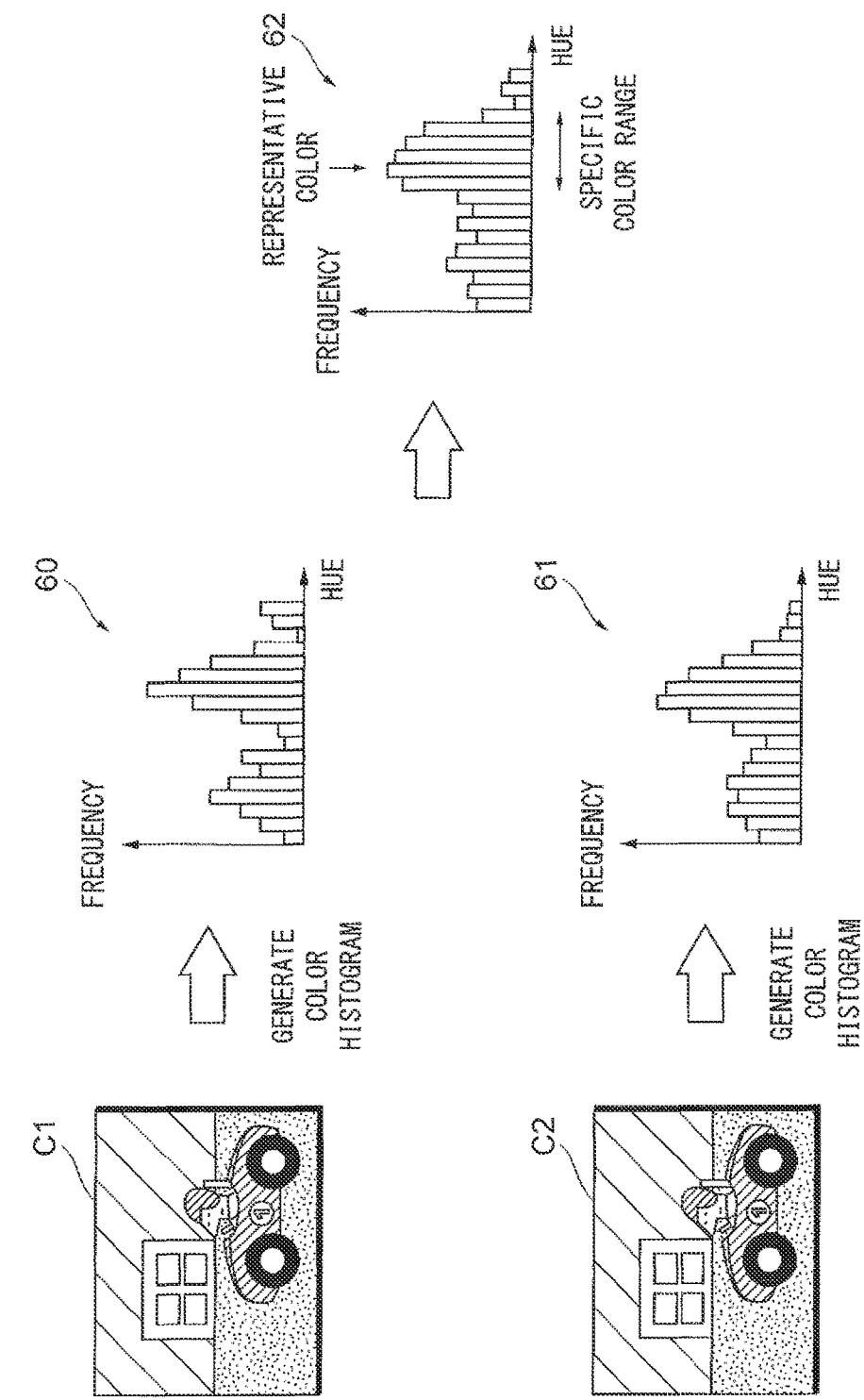
FIG. 10 illustrates the manner in which a specific color range is decided.

FIGS. 9 and 10 illustrate a modification. FIG. 9 is a flowchart illustrating processing executed by the digital still camera and corresponds to the flowchart of FIG. 2. Processing steps in FIG. 9 identical with those shown in FIG. 2 are indicated by like step numbers. FIG. 10 illustrates processing flow up to processing for deciding the specific color range and corresponds to FIG. 8.

In the foregoing embodiment, a single histogram is generated from one frame of the color image of a subject and the specific color range is decided by utilizing this single generated color histogram in contrast, in this modification, multiple color histograms are generated from respective ones of multiple frames of the color image of a subject and a specific color range is decided by utilizing a color histogram obtained from a weighted average of the multiple color histograms generated.

The digital still camera is set to the imaging mode and the subject is imaged (step 41 in FIG. 9), whereby the color subject image C1 shown in FIG. 10 is obtained. The color histogram 60 is generated from the obtained color subject image C1, as shown in FIG. 10 (step 42 in FIG. 9).

In the case of the initial capture of the image (step 71 in FIG. 9), multiple color images of the subject cannot be utilized. In a manner similar to that described above, therefore, a single histogram is generated from one frame of the color image of the subject and the specific color range is decided by utilizing this single generated color histogram. If a fixing instruction is issued, then the range is fixed at the specific color range that has been decided (step 48 in FIG. 9). If this is not the initial image capture ("NO" at step 71 in FIG. 9), the next imaging operation is performed (step 72 in FIG. 9) and the color subject image C2 shown in FIG. 10 is obtained. P color histogram 61 is generated, as shown in FIG. 10, from the color subject image C2 obtained (step 73 in FIG. 9).

When the multiple color histograms 60 and 61 are obtained from the multiple color subject images C1 and C2 (these multiple color subject images may be images that have been captured successively or images that have not been captured successively), the multiple color histograms 60 and 61 are weighted and averaged (step 74) in FIG. 9 so that a weighted-and-averaged color histogram 62 is obtained, as shown in FIG. 10. As set forth above, a given fixed range may be adopted as the specific color range centered on the hue having the highest frequency of occurrence, the specific color range may be decided from the hue having the highest frequency of occurrence based upon a dispersion value of the color histogram, or it may be arranged so that the specific color range is decided in accordance with the state of the color histogram in such a manner that a hue for which the frequency of occurrence is greater than a given value is adopted as the specific color range. Further, the weighted-and-averaged color histogram may be generated by utilizing two-dimensional color histograms in each of which the color differences Cr and Cb are plotted along the axes so that the histograms will represent the frequencies of occurrence of these color differences, or three-dimensional histograms in each of which the colors R, G, B are plotted along the axes so that the histograms represent frequencies of occurrence of these colors.

Figure 11:
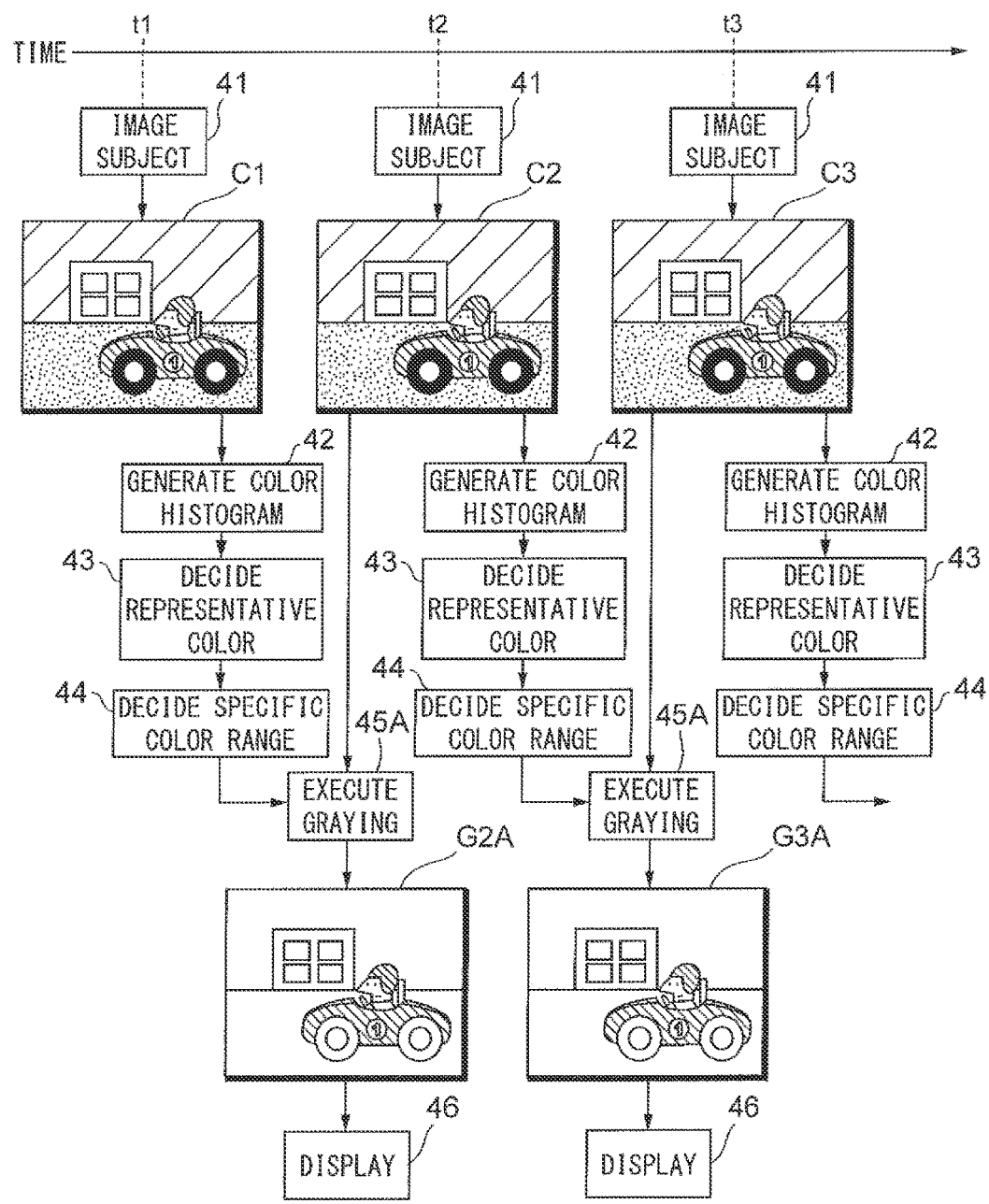
FIG. 11 is a flowchart illustrating processing executed by the digital still camera.

FIG. 11, which illustrates another embodiment, shows processing for generating the image of a subject in which non-specific colors have been changed to gray. FIG. 11 corresponds to FIG. 4.

This modification subjects the color image of a subject, which is captured after the color image of a subject that has been utilized in order to decide a specific color range, to graying processing utilizing the specific color range that has already been decided.

When the imaging mode is set, the subject is imaged at time t1 (step 41) and the color subject image C1 is obtained, as described above. The generation of the color histogram, the decision regarding the representative color and the decision regarding the specific color range, which are performed using the color subject image C1 obtained, are carried out in the manner described above (steps 42 to 44).

When time t2 arrives, the subject is imaged again (step 41) and the color subject image C2, which is the next color image, is obtained. The color subject image C2 obtained is subjected to graying processing, based upon the color subject image C1 that was captured before the color subject image C2, so as to change to gray the colors that are outside of the specific color range decided in the manner set forth above (step 45A). A thus obtained image G2A of the subject in which non-specific colors have been changed to gray is displayed on the display screen of the display unit 29 (step 46). The image G2A of the subject in which non-specific colors have been changed to gray can be displayed comparatively quickly because the deciding of the specific color range will have been finished before the color subject image C2, which is to be subjected to graying processing, is obtained, or because the preparations for deciding the specific color range will have been made.

Further, the generation of the color histogram, the decision regarding the representative color and the decision regarding the specific color range are carried out utilizing the color subject image C2 obtained by imaging at time t2, and the result is utilized in the graying processing of the color subject image C3, which is captured after the color subject image C2. An image G3A of the subject in which non-specific colors have been changed to gray, which image is the result of applying graying processing to the color subject image C3, is displayed on the display screen of the display unit 29.

In the above-described embodiment, the specific color range obtained based upon the color subject image C1 captured immediately prior to the color subject image C2 that is to undergo graying processing is used in graying processing of the color subject image C2 captured immediately after the color subject image C1 that was used in deciding the specific color range. However, it may be arranged so that graying processing is executed using a specific color range obtained based upon a color subject image captured several frames earlier instead of the color subject image C1 captured immediately prior to the color subject image C2 that is to undergo graying processing. Further, since it may be considered that the color histogram is not likely to change suddenly from one image capture to the next, it is not necessary to calculate the specific color range every time imaging is performed and an arrangement may be adopted in which the calculation is performed based upon the color image of a subject obtained by image capture performed at regular intervals.

Figure 12:
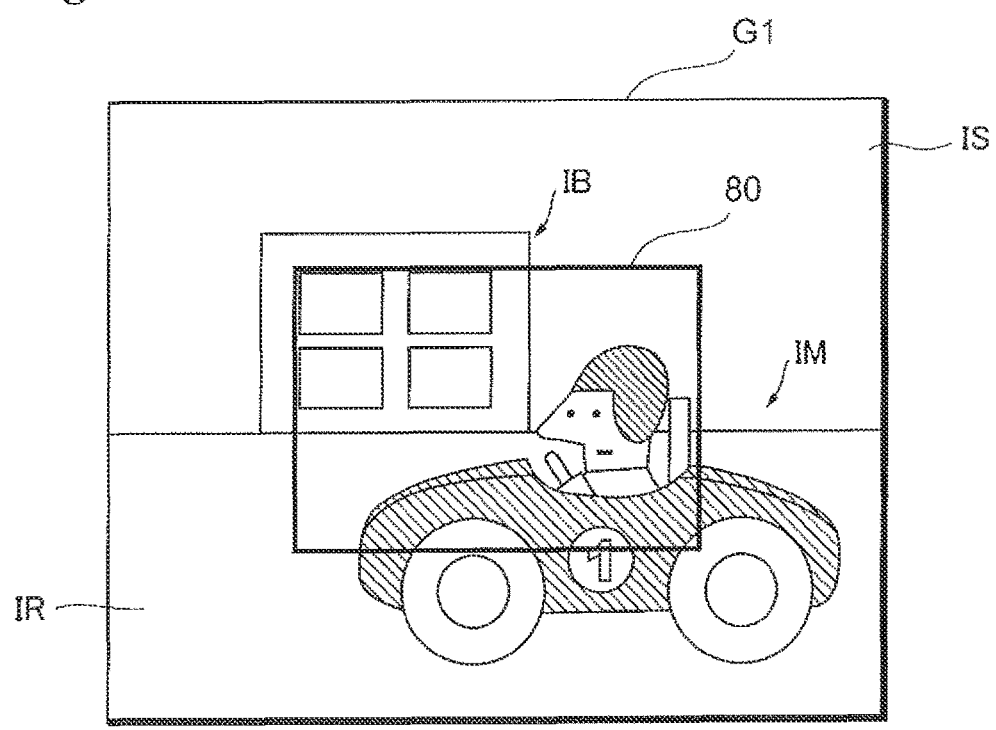
FIG. 12 is an example of the image of a subject in which non-specific colors have been changed to gray.

FIG. 12, which illustrates a further modification, shows the image G1 of the subject obtained as described above in which non-specific colors have been changed to gray.

A region-of-interest frame 80 is being displayed on the image G1 of the subject in which non-specific colors have been changed to gray.

In the foregoing embodiment a color histogram is generated from the entirety of the color image of a subject obtained by imaging and the specific color range is decided as described above. In this modification, a color histogram is generated using a portion that corresponds to the image within the region-of-interest frame 80 in the color image of the subject obtained by imaging, and the specific color range is decided in the manner described above. The region-of-interest frame 80 may be preset at a position corresponding to the central portion of the color image of the subject or at another position.

In the example shown in FIG. 12, the region-of-interest frame 80 has been set so as to contain a large portion of the image IM of the subject, which is the automobile. This makes it possible to prevent the color of the image IS of the sky and the color of the image IR of the road from affecting the decision regarding the specific color range. The specific color range can thus be decided based upon the desired portion of the image of the subject. Further, the fact that the region-of-interest frame 80 is displayed means that if a specific color range desired by the user has not been set, then the desired specific color range can be set by moving the digital still camera. (For example, if the user desires to set the color of the vehicle body of the automobile as the specific color range, then the user moves the digital still camera so as to display the region-of-interest frame 80 on the vehicle body.) The region-of-interest frame 80 need not necessarily be displayed, as a matter of course.

Further, besides fixing the region-of-interest frame 80 at the central portion, it may be arranged so that the region-of-interest frame 80 is set with respect to an image representing a subject located a short distance from front the digital still camera, or an arrangement may be adopted in which the image of a moving subject is detected and the region-of-interest frame 80 is set with respect to this image of the subject. In such case it goes without saying that the digital still camera would be provided with devices such as a device for measuring the distance to the subject and a device for detecting a moving body.

Figure 13:
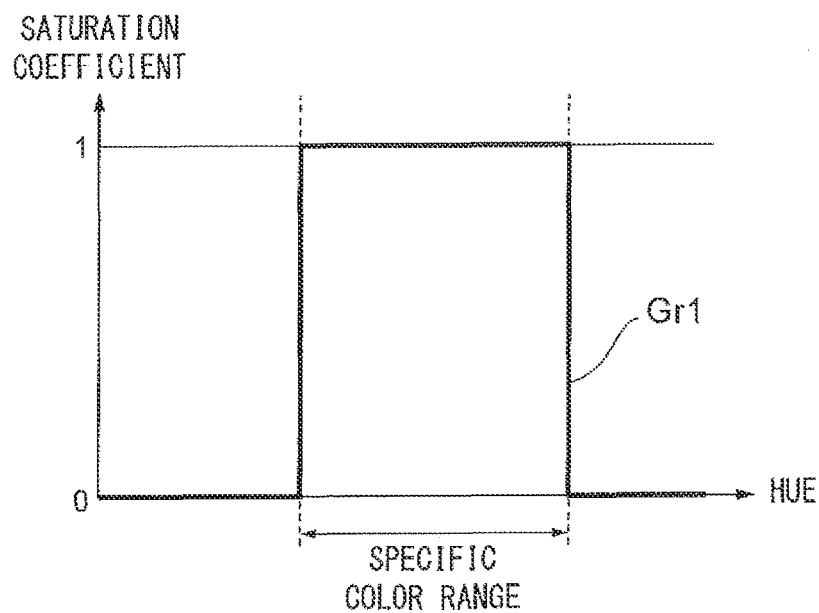
FIGS. 13 and 14 illustrate the relationship between hue and saturation coefficients.
Figure 14:
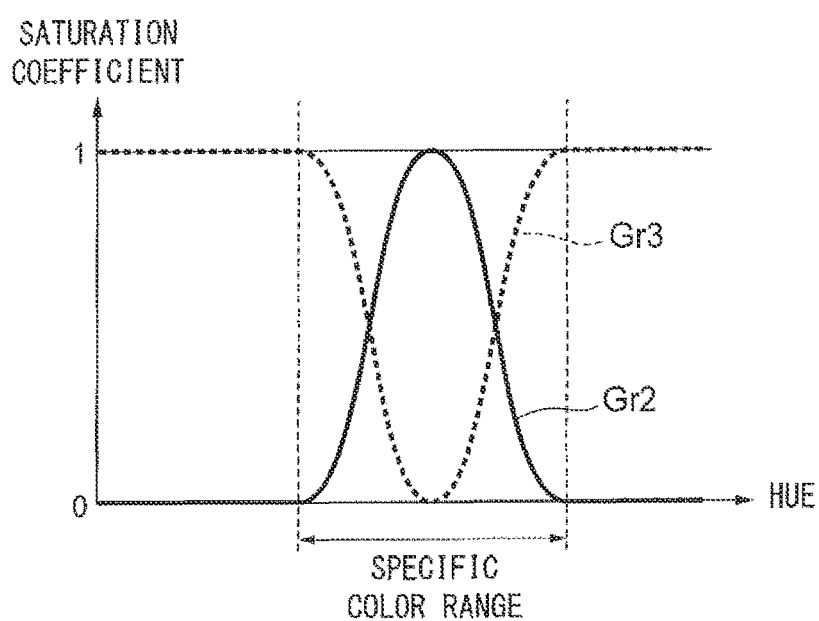

FIGS. 13 and 14 illustrate the relationship between hue and saturation coefficients, which is used in graying processing. Hue is plotted along the horizontal axis and the saturation coefficient along the vertical axis.

Reference will be had to FIG. 13. When a specific color range is decided in the manner described above, graying processing is executed in such a manner that colors outside the specific color range have their saturation eliminated.

Therefore, color within the specific color range is subjected to graying processing using a saturation coefficient of 1 (saturation is unchanged) and color outside the specific color range is subjected to graying processing using a saturation coefficient 0 (saturation is eliminated).

However, if the saturation coefficient changes suddenly from 0 to 1 or from 1 to it at a boundary location of the specific color range as indicated by graph Gr1 in FIG. 13, a boundary line may clearly appear at this boundary location. For example, in a case where the color green of the body of the automobile has been decided upon as the specific color range, as described above, a boundary line is produced at the portion of a color, which is judged to be outside the specific color range, when the green color of the body of the automobile grows gradually fainter or when other colors gradually change. As a consequence, the image of a subject in which non-specific colors have been changed to gray becomes unattractive. This modification prevents the occurrence of such boundary lines.

In a graph Gr2 representing hue and saturation coefficient shown in FIG. 14, the saturation coefficient corresponding to hue outside the specific color range is 0 but not all of the saturation coefficients corresponding to hue outside the specific color range are 1. The saturation coefficient corresponding to hue at the center of the specific color range is 1, but the saturation coefficient diminishes gradually with distance from the center of the specific color range and becomes 0 at the boundaries of the specific color range. If graying processing is executed based upon such a relationship between hue and saturation coefficient, the saturation of the boundary portions of the specific color range will gradually diminish and the occurrence of the above-mentioned border lines can be prevented.

In the example of the graph Cr2 shown in FIG. 14, this represents a case where graying processing is applied to the outside of the specific color range. However, in a case where graying processing is applied to the interior of the specific color range, it may be arranged so that, as shown by graph Gr3 in FIG. 14, the saturation coefficient outside the specific color range is made 1, the saturation coefficient at the center of the specific color range is made 0 and the saturation coefficient approaches 1 gradually as the boundaries of the specific color range are approached. Further, an arrangement may be adopted in which the saturation coefficient is made 1 or 0 within the specific color range and will approach 0 or 1 gradually with distance from the boundaries of the specific color range to the outside thereof.

In the foregoing embodiment, color outside or inside the specific color range is subjected to gray processing by making 0 the saturation coefficient. However, the saturation coefficient need not necessarily be made 0. It may be arranged so that graying processing is executed by making the saturation coefficient less than 1.

FIGS. 15 to 19 illustrate yet another modification. In this modification, a specific color retention area is set beforehand and graying processing is executed to leave only the color within a specific color range inside the specific color retention area. Even color within the specific color range is changed to gray if the specific color range is outside the specific color retention area.

Figure 15:
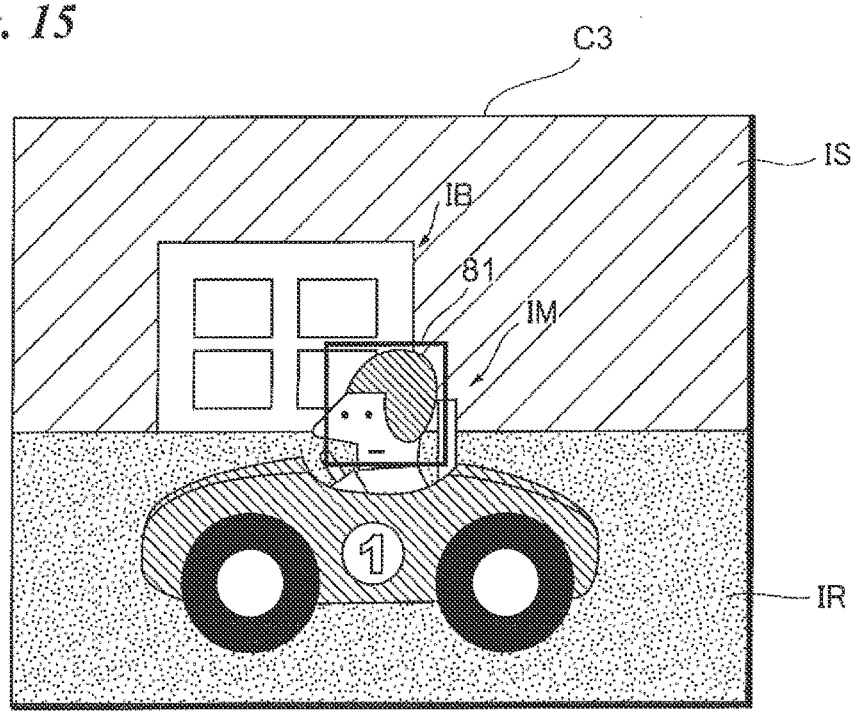
FIG. 15 is an example of the color image of a subject.

FIG. 15 is an example of the color subject image C3 obtained by imaging.

A specific color retention area frame 81 has been set in the color subject image C3. The color subject image C3 is displayed before the generation of the image of a subject in which non-specific colors have been grayed, as described above, and the specific color retention area frame 81 is set by the user while the user looks at the color subject image C3 being displayed. However, an arrangement may be adopted in which the image of a subject in which non-specific colors have been grayed is generated, the generated image of the subject in which non-specific colors have been grayed is displayed and the user sets the specific color retention area frame 81 while the user looks at the displayed image of the subject in which non-specific colors have been grayed. If a touch-sensitive panel has been formed on the display screen of the display unit 29, the specific color retention area frame 81 can be set by touching or sweeping a finger across the panel, or a setting button may be provided in the operating unit 11. Naturally, a face or moving portion detected by face or moving-body detection may be adopted as the specific color retention area. A portion of the subject for which the distance from the digital still camera to the subject is shorter than a predetermined distance may be adopted as the specific color retention area. Further, in a case where the color image of a subject is displayed before the display of an image in which non-specific colors have been change to gray, the specific color retention area frame may or may not be displayed on this color image of the subject. Further, the specific color retention area frame may or may not be displayed on an image in which non-specific colors have been change to gray.

When the specific color retention area frame 81 is set, only the color within the specific color range inside the set specific color retention area frame 81 in the color image of the subject remains as is, as mentioned above. If inside the specific color retention area frame 81, colors outside the specific color range are changed to gray. If outside the specific color retention area frame 81, colors are grayed regardless of whether inside or outside the specific color range. The specific color range may be decided from the entirety of the color subject image C3 or may be decided from the color image of the portion of the subject inside the region-of-interest frame 80 in the manner illustrated in FIG. 12. In the case where the specific color range is decided from the color image of the portion of the subject inside the region-of-interest frame 80 in the manner shown in FIG. 12, the specific color retention area frame 81 and region-of-interest frame 80 may constitute a single common area or separate areas.

Figure 16:
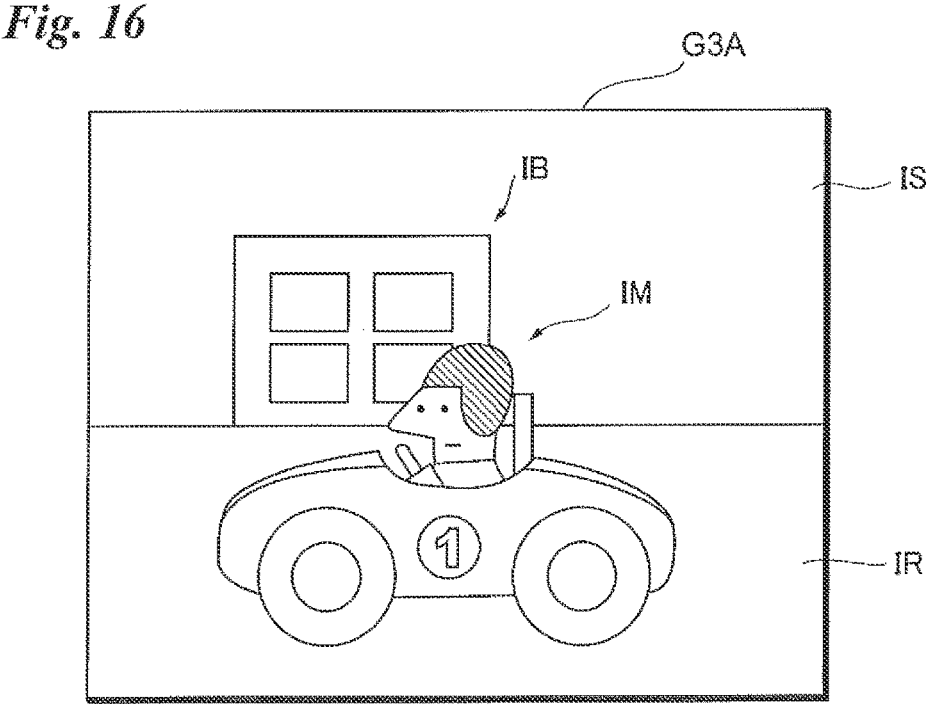
FIG. 16 is an example of the image of a subject in which non-specific colors have been changed to gray.

FIG. 16 is an example of the image G3A of the subject in which non-specific colors have been changed to gray.

If the specific color range has been decided to be a range that can be considered identical with the color green in a case where the green helmet falls within the specific color retention area frame 81, as shown in FIG. 15, then, as shown in FIG. 16, only the green color of the helmet (indicated by the hatching) that falls within the specific color retention area frame 81 is left as is and the color of the vehicle body of the automobile, which is outside the specific color retention area frame 81, is changed to gray even though it falls within the specific color range. The color only of a desired portion (e.g., the helmet) of a principal subject can be left as is.

However, if the entirety of a desired portion of a principal subject falls inside the specific color retention area frame 81, the color of the entirety of the desired portion of this principal subject can be left intact, as described above, but in a case where only a part of the desired portion of this principal subject falls inside the specific color retention area frame 81, it so happens that the color of this part of the portion of the desired principal subject will be left intact and the remaining portion will be changed to gray. This will result in display of an unattractive image of a subject in which non-specific colors have been changed to gray.

Figure 17:
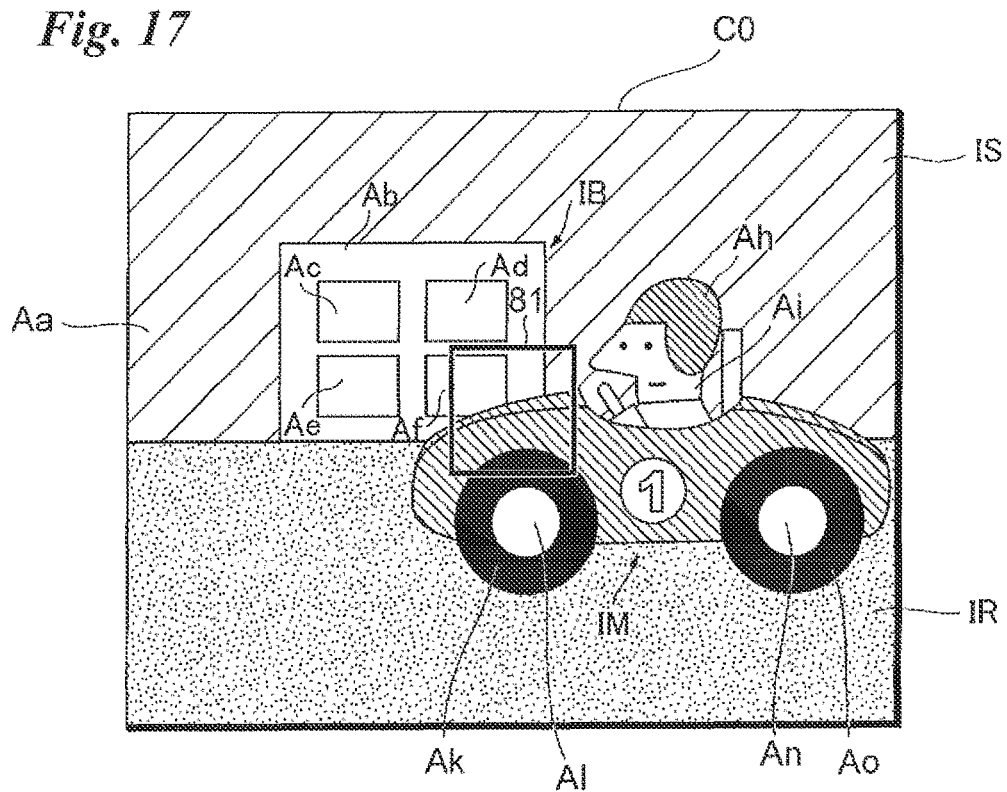
FIG. 17 is an example of the color image of a subject.
Figure 18:
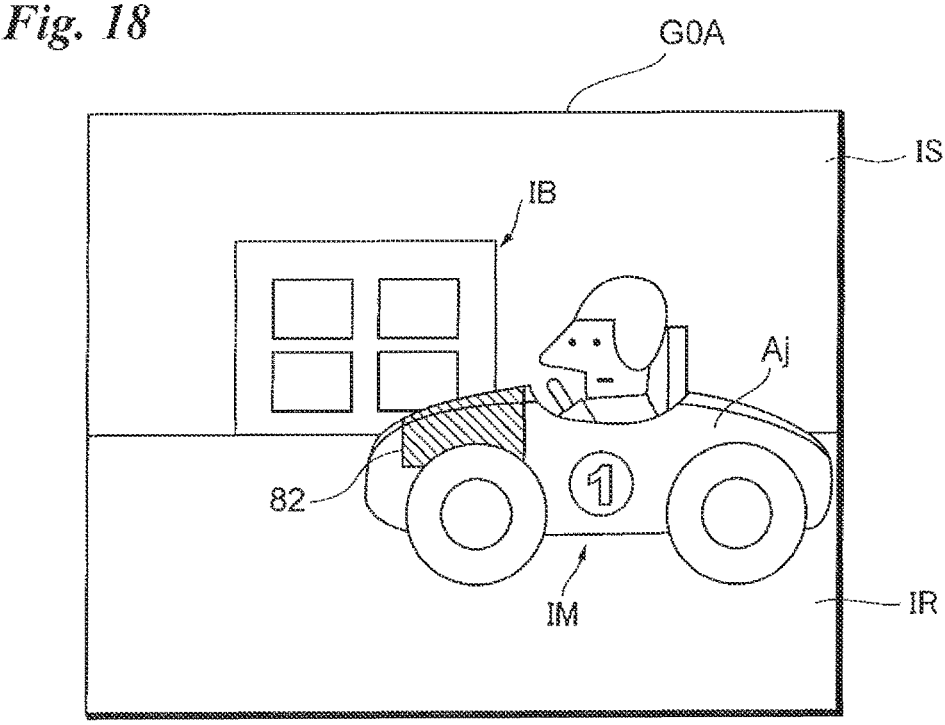
FIGS. 18 and 19 are examples of images of a subject in which non-specific colors have been changed to gray.
Figure 19:
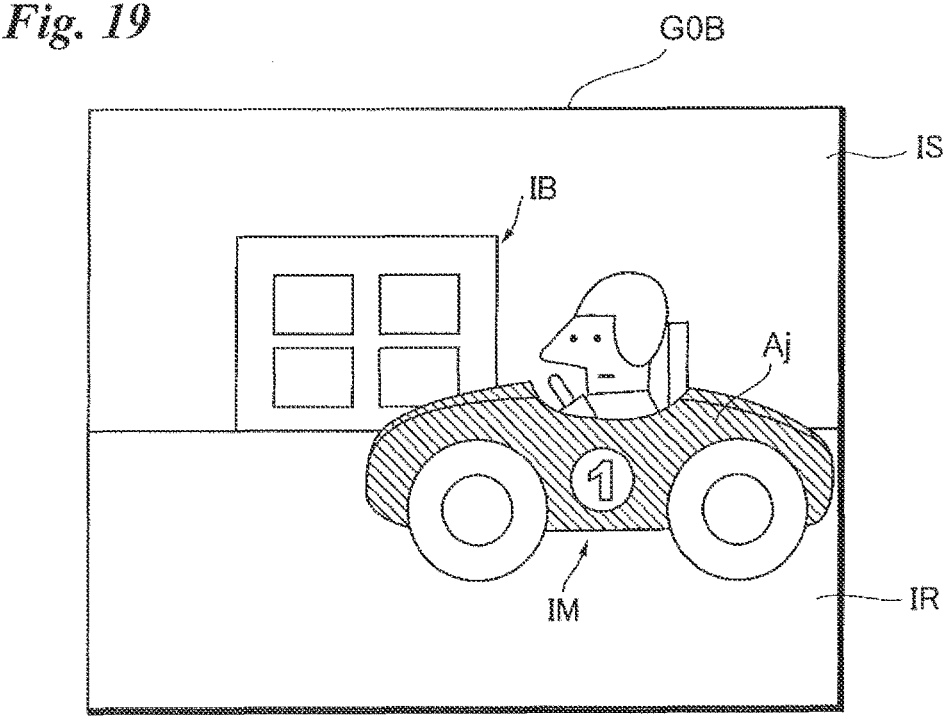

FIGS. 17 to 19 illustrate how it is arranged so as to avoid display of an unattractive image of a subject in which non-specific colors have been changed to gray.

FIG. 17 is an example of a color image C0 of a subject obtained by imaging.

The color image C0 of the subject obtained by imaging is partitioned into areas color by color. In a manner similar to the color subject image C1 shown in FIG. 6, the sky IS is the light-blue area Aa, and the building IB includes the white area Ab as the building proper and the color areas Ac, Ad, Ae and Af that are windows. The road IR is the brown area Ag, and the automobile IM has the green area Aj as the vehicle body, black areas Ak and Ao as tires, silver areas Al and An as wheels and the white area Am as the number. Further, the image includes the skin-color area Ai as the face of the driver of the automobile IM, and the green area Ah as the helmet of the driver. The color subject image C0 is partitioned into these areas Aa to Ao.

Further, assume that the specific color retention area frame 81 has been set at the approximate center of the color subject image C1. Further, assume that the specific color range is green, which is the color of the vehicle body of the automobile, and that a portion of the vehicle body of the automobile falls within the specific color retention area frame 81.

FIG. 18 is an example of an image G0A of a subject in which non-specific colors have been changed to gray.

As mentioned above, the specific color range is green, which is the color of the vehicle body of the automobile, and a portion 82 of the vehicle body of the automobile is included within the specific color retention area frame 81. In a case where the entirety of the vehicle body of the automobile does not all within the specific color retention area frame 81, only the color of the portion 82 of the vehicle body is left intact while everything else, including the remaining portion of the vehicle body of the automobile, has its color changed to gray. As a consequence, as mentioned above, the result is the unattractive image G0A of the subject in which non-specific colors have been changed to gray.

In this modification, therefore, graying processing is executed in such a manner that the color of the entirety of the area Aj of the body of the automobile is left intact so as to obtain an image G0B of the subject in which non-specific colors have been changed to gray, as shown in FIG. 19.

Graying processing is executed except with regard to the entire area Aj of the body of the automobile, which includes the portion 82, so as not to leave only the color of the portion 82 of the vehicle body as the color, as is the case shown in FIG. 18. Since the color of the entire area Aj of the body of the automobile that includes the portion 82 of the vehicle body is left as color, an image G3C of the subject in which non-specific colors have been changed to gray is improved in appearance. In this manner the area Aj in which the color is left intact may be adopted as a new specific color retention area. In the case of this example, the fact that the vehicle body of the automobile is adopted as the specific color retention area means that, even if the automobile moves, the color of the vehicle body will remain while other portions are changed to gray.

Further, as illustrated in FIG. 14, as arrangement may be adopted in which graying processing is executed in such a manner that saturation is gradually weakened (or strengthened) at the boundary portions of the specific color range.

Although a digital still camera has been described above as an embodiment of an image sensing apparatus according to the present invention, there is no limitation upon the configuration of the image sensing apparatus. A digital movie video camera, a built-in or externally mounted camera for a personal computer, or a mobile terminal device of the kind described below having an image sensing function can be adopted as the image sensing apparatus.

By way of example, a mobile telephone, smart phone, PDA (Personal Digital Assistant) and portable game machine can be mentioned as mobile terminal devices embodying an image sensing apparatus of the present invention.

Figure 20:
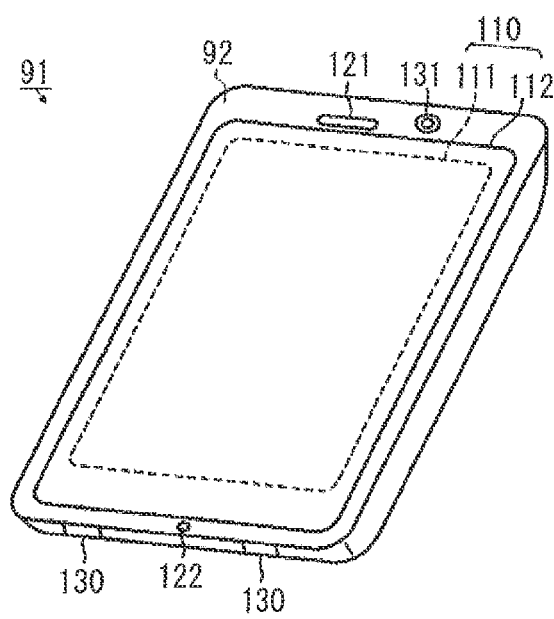
FIG. 20 illustrates the external appearance of a smart phone.

FIG. 20 illustrates the external appearance of a smart phone 91, which is an embodiment of an image sensing apparatus according to the present invention. The smart phone 91 shown in FIG. 20 has a flat case 92 one side face of which is equipped with a display input unit 110 comprising an integrated display panel 111, which serves as the display section, and an operating panel 112 serving as the input section. The case 92 is equipped with a speaker 121, a microphone 122, an operating unit 130 and a camera unit 131. It should be noted that the construction of the case 92 is not limited to that described and it is possible to employ, for example, an arrangement in which the display section and input section are independent of each other or an arrangement having a clam-shell structure or a sliding mechanism.

Figure 21:
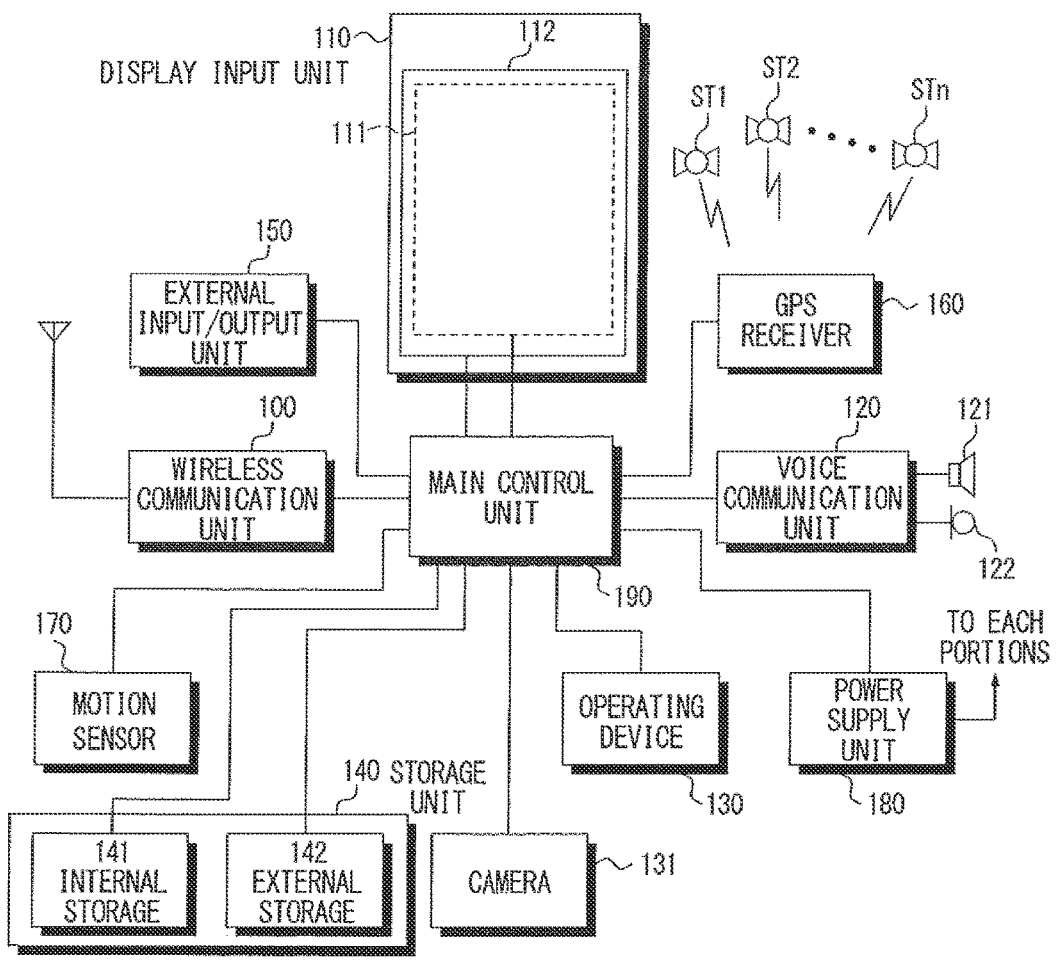
FIG. 21 is a block diagram illustrating the electrical configuration of a smart phone.

FIG. 21 is a block diagram illustrating the configuration of the smart phone 91 shown in FIG. 20. As shown in FIG. 21, the main components of the smart phone 91 are a wireless communication unit 100, the display input unit 110, a voice communication unit 120, the operating unit 130, the camera unit 131, a storage unit 140, an external input/output unit 150, a GPS (Global Positioning System) receiver 160, a motion sensor unit 170, a power supply unit 180 and a main control unit 190. The main function of the smart phone 91 is a wireless communication function for performing mobile wireless communication via a base station apparatus BS and a mobile communication network NW.

In accordance with a command from the main control unit 190, the wireless communication unit 100 wirelessly communicates with the base station apparatus BS accommodated in the mobile communication network NW. Using such wireless communication, the wireless communication unit 100 sends and receives various file data such as voice data and image data as well as email data and the like, and receives data such as Web data and streaming data.

Under the control of the main control unit 190, the display input unit 110, which is a touch-sensitive panel having the display panel 111 and operating panel 112, displays images (still images and moving images) and text information and conveys information visually to the user, and detects operation by the user in response to the information displayed.

The display panel 111 uses an LCD (Liquid-Crystal Display) or an OELD (Organic Electro-Luminescence Display) or the like is used as a display device. The operating panel 112 is a device mounted such that images displayed on the display screen of the display panel 111 and detects one or multiple coordinates entered by the user's finger or by a stylus. When the device is operated by the user's finger or by a stylus, a detection signal generated as a result of this operation is output to the main control unit 190. Next, the main control unit 190 detects the operated position (coordinates) on the display pane 111 based upon the detection signal received.

Although the display input unit 110 is constructed by integrating the display panel 111 and operating panel 112 of the smart phone 91 exemplified as the embodiment of the image sensing apparatus of the present invention, as illustrated in FIG. 20, the arrangement is such that the operating panel 112 completely covers the display panel 111. In a case where such an arrangement is adopted, the operating panel 112 may be equipped with a function for detecting a user operation applied also to an area outside the display panel 111. In other words, the operating panel 112 may be equipped with a detection area (referred to as a "display area" below) regarding the portion that overlaps the display panel 111, and with a detection area (referred to as a "non-display area" below) regarding the fringe portion that does not overlap the rest of the display panel 111.

It should be noted that although the size of the display area and the size of the display panel 141 may be made to match perfectly, the two need not necessarily be made to match. Further, the operating panel 112 may be equipped with two sensitive regions, namely one on the fringe portion and one on the portion inwardly thereof. Furthermore, the width of the fringe portion is designed appropriately in accordance with the size of the case 92. In addition, systems such as a matrix switch system, resistive-film system, surface elastic wave system, infrared system, electromagnetic induction system and electrostatic capacitance system can be mentioned as position detection systems employed by the operating panel 112, and any of these systems can be adopted.

The voice communication unit 120, which has the speaker 121 and microphone 122, converts the user's voice, which has entered through the microphone 122, to voice data processable by the main control unit 190, decodes voice data, which has been received by the wireless communication unit 100 or external input/output unit 150, and outputs the decoded data from the speaker 121. Further, as shown in FIG. 20, and by way of example, the speaker 121 can be mounted on the same face as the face provided with the display input unit 110, and the microphone 122 can be mounted on the side face of the case 92.

The operating unit 130, which is a hardware key that employs a key switch or the like, accepts commands from the user. For example, as shown in FIG. 20, the operating unit 130 is a push-button switch mounted on the side face of the case 92 of the smart phone 91. The switch is turned ON by being pressed by a finger or the like and is restored to the OFF state by the restoration force of a spring or the like when the user removes his finger.

The storage unit 140 stores the control program and control data of the main control unit 190, applications, software, address data associated with the names and telephone numbers, etc., of communicating parties, email data sent and received, Web data downloaded by Web browsing, and downloaded content, and also stores streaming data temporarily. Further, the storage unit 140 is constituted by an internal storage device 141, which is built in the smart phone, and a removable external storage device 142 having an external memory slot. The internal storage device 141 and external storage device 142 constructing the storage unit 140 are implemented using storage media such as a flash memory, hard disk, a multimedia card micro-type memory or card-type memory [e.g., Micro SD (registered trademark) memory or the like], RAM (Random-Access Memory) and ROM (Read-Only Memory).

The external input/output unit 150, which functions as the interface with all external devices connected to the smart phone 91, is for connecting directly or indirectly other external devices as by communication [such as Universal Serial Bus (USE) or IEEE 1394] or network [e.g., Internet, wireless LAN (Local-Area Network), Bluetooth (registered trademark), RFID (Radio-Frequency Identification), Infrared Data Association: IrDA (registered trademark), UWB (Ultra-Wideband (registered trademark) or ZigBee (registered trademark)].

Examples of devices connected to the smart phone 91 are a wired/wireless headset; wired/wireless external charging device; wired/wireless data port; memory card or SIM (Subscriber Identity Module Card)/UIM (User Identity Module) card connected via a card socket; external, audio/video device connected via an audio/video I/O (Input/Output) terminal; wirelessly connected external audio/video device; wired/wireless connected smart phone; wired/wirelessly connected personal computer; wired/wirelessly connected PDA; wired/wirelessly connected personal computer; and earphone. The external input/output section can be adapted so as to transmit data, which has been received from such external devices, to each component within the smart phone 91, and so as to transmit data within the smart phone 91 to the external devices.

In accordance with a command from the main control unit 190, the GPS receiver 160 receives GPS signals sent from OPS satellites ST1 to STn, executes positioning processing that is based upon multiple GPS signals received, and detects position comprising the longitude, latitude and elevation of the smart phone 91. When position information is capable of being acquired from the wireless communication unit 100 or external input/output unit 150 (e.g., wireless LAN), the GPS receiver 160 can also detect position using this position information.

The motion sensor 170, which has a three-axis acceleration sensor, for example, detects physical motion of the smart phone 91 in accordance with a command from the main control unit 190. The traveling direction and acceleration of the smart phone 91 are detected by detecting the physical motion of the smart phone 91. The result of such detection is output to the main control unit 190.

In accordance with a command from the main control unit 190, the power supply unit 180 supplies each unit of the smart phone 91 with power stored in a battery (not shown).

The main control unit 190, which is equipped with a microprocessor, operates in accordance with a control program and control data stored by the storage unit 140 and controls overall operation of each unit of the smart phone 91. Further, the main control unit 190 has a mobile communication control function, which controls each unit of the communication system, and an application processing function, in order to perform voice communication and data communication through the wireless communication unit 100.

The application processing function is implemented by operation of the main control unit 190 in accordance with application software stored by the storage unit 140. Examples of the application processing function are an infrared communication function for communicating data with an opposing device by controlling the external input/output unit 150, an email function for sending and receiving email, and a Web browsing function for viewing Web pages.

The main control unit 190 has an image processing function for displaying video on the display input unit 110 based upon received data and image data (still-image data and moving-image data) such as downloaded streaming data. The image processing function refers to a function whereby the main control unit 190 decodes the above-mentioned image data, applies image processing to the decoded result and displays the resultant image on the display input unit 110.

The main control unit 190 further executes display control of the display panel 111 and operation detection control for detecting user operation through the operating unit 130 and operating panel 112. By executing display control, the main control unit 190 displays icons for launching application software, software keys such as a scroll bar, or displays a window for creating email. It should be noted that the scroll bar refers to a software key for accepting a command, which moves a displayed portion of an image, with regard to an image too large to fit in the display area of the display panel 111.

Further, by executing operation detection control, the main control unit 190 detects user operation performed via the operating unit 130, accepts tapping of the icons and character-string inputs to an input section of the above-mentioned window via the operating panel 112, or accepts a displayed-image scroll request issued through the scroll bar.

Furthermore, the main control unit 190 has a touch-sensitive-panel control function which, through execution of the operation detection function, determines whether a position touched on the operating panel 112 is a portion (the display area) that overlaps the display panel 111 or a fringe portion (the non-display area) that does not overlap the display panel 111, and controls the sensitive region of the operating panel 112 and the display positions of software keys.

Further, the main control unit 190 detects gestures applied to the operating panel 112 and is capable of executing preset functions in accordance with a detected gesture. Here a gesture refers not to a simple, conventional touching operation but to the tracing of a path by a finger or the like, the designation of multiple positions simultaneously, or an operation which, by combining these, traces a path with regard to at least one of multiple positions.

The camera unit 131 is a digital camera for performing electronic shooting using a CMOS (Complementary Metal-Oxide Semiconductor) or CCD (Charge-Coupled Device) or the like. Further, under control exercised by the main control unit 190, the camera unit 131 converts image data obtained by imaging to compressed image data such as JPEG (Joint Photographic coding Experts Group) data and is capable of storing the compressed image data in the storage unit 140 or of outputting the data through the external input/output unit 150 or wireless communication unit 100. In the smart phone 91 shown in FIG. 20, the camera unit 131 has been mounted on the same side as that having the display input unit 131. However, the mounting position of the camera unit 131 is not limited to that shown. The camera unit 131 may be mounted on the back side of the display input unit 110, and it is permissible to mount a plurality of camera units 131. It should be noted that in a case where a plurality of the camera units 131 have been mounted, the camera units 131 used in shooting may be switched among and used singly, or shooting may be performed by using the plurality of camera units 131 simultaneously.

Further, the camera unit 131 can be utilized for various functions possessed by the smart phone 91. For example, an image acquired by the camera unit 131 can be displayed on the display panel 111, and the image from the camera unit 131 can be utilized as one operational input on the operating panel 112. Further, when the GPS receiver 160 detects position, position can also be detected by referring to the image from the camera unit 131. Furthermore, by referring to the image from the camera unit 131, the optical-axis direction of the camera unit 131 of the smart phone 91 can be determined without using a three-axis acceleration sensor or in conjunction with a three-axis acceleration sensor, and the present environment of use can be determined. Naturally, the image from the camera unit 131 can be utilized within the application software as well.

In addition, such information as position information acquired by the GPS receiver 160, voice information acquired by the microphone 122 (which may be text information obtained by a voice-to-text conversion performed by the main control unit or the like), and attitude information acquired by the motion sensor 170 can be appended to still-image or moving-image data and the result can be stored in the storage unit 140 or can be output through the external input/output unit 150 or wireless communication unit 100.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
a color imaging device for sensing the image of a subject and outputting color image data representing a color image of the subject; and
a processor circuitry configured for:
deciding a hue value of a specific color having a highest frequency of occurrence in the color image of the subject;
deciding a specific color range indicating the range of a color that can be considered a color substantially identical with the decided hue value of the specific color;
changing color saturation of the color image of the subject and changing saturation of color within the decided specific color range or of color outside the decided specific color range;
controlling a display device so as to display the color image of the subject, the color saturation of which has been changed;
exercising control so as to repeat processing for outputting a color image of the subject, processing for deciding a hue value of a specific color, processing for deciding a specific color range, processing for adjusting saturation, and processing for controlling display of the color image of the subject; and
operative upon receipt of a specific color fixing instruction, adjusting saturation of the color image of the subject based upon a specific color range fixed by said specific color fixing instruction.

2. The apparatus according to claim 1, wherein said processing circuitry decides that a specific color of an image of interest within a specific color retention area, which is a portion of the color image of the subject, is the specific color of the color image of the subject; and
changes, in the color image of the subject, the saturation of color outside the specific color retention area, lowering the saturation of color outside the decided specific color range.

3. The apparatus according to claim 2, wherein said processing circuitry further partitions the color image of a subject into areas color by color; and
changes, in the color image of the subject, the saturation of color outside the specific color retention area, lowering the saturation of color outside the decided specific color range, with the exception of a region containing a portion that includes the decided specific color within the specific color retention area.

4. The apparatus according to claim 1, wherein said processing circuitry decides, based upon multiple color images of a subject obtained by performing image capture multiple times in succession, that a weighted specific color range, which is obtained by taking a weighted average of multiple specific color ranges decided for every color image of the subject, is the specific color range.

5. The apparatus according to claim 1, wherein said processing circuitry changes the color saturation of the color image of a subject captured after the color image of a subject used in the decided specific color range; and changes the saturation of color within the decided specific color range or of color outside the decided specific color range.

6. The apparatus according to claim 1, wherein said processing circuitry decides that the specific color of an image of interest within a region of interest, which is a portion of the color image of the subject, is the specific color of the color image of the subject.

7. The apparatus according to claim 6, wherein said processing circuitry controls the display device in such a manner that the extent of the region of interest is displayed on the color image of the subject displayed.

8. The apparatus according to claim 1, wherein said processing circuitry gradually changes color saturation of the color image of the subject near boundaries of the decided specific color range.

9. The apparatus according to claim 1, wherein said processing circuitry gradually changes color saturation of the color image of the subject near boundaries of the specific color range fixed by the specific color fixing instruction.

10. A method of controlling operation of an image sensing apparatus comprising the steps of:

sensing the image of a subject and outputting color image data representing a color image of the subject;

deciding a hue value of a specific color having a highest frequency of occurrence in the color image of the subject;

deciding a specific color range indicating the range of a color that can be considered a color substantially identical with the hue value of the specific color decided;

changing color saturation of the color image of the subject, wherein saturation of color within the decided specific color range decided or of color outside the decided specific color range is changed;

controlling a display device so as to display the color image of the subject the saturation of which has been changed;

exercising control so as to repeat processing for outputting a color image of the subject, processing for deciding a hue value of a specific color, processing for deciding a specific color range, processing for adjusting saturation and processing for controlling display of the color image of the subject; and upon receipt of a specific color fixing instruction, adjusting saturation of the color image of the subject based upon a specific color range fixed by the specific color fixing instruction.

* * * * *